US012601943B2

(12) United States Patent
Xi et al.

(10) Patent No.: US 12,601,943 B2
(45) Date of Patent: Apr. 14, 2026

(54) DISPLAY PANEL, PREPARATION METHOD OF DISPLAY PANEL AND DISPLAY DEVICE

(71) Applicant: Xiamen Tianma Optoelectronics Co., Ltd., Xiamen (CN)

(72) Inventors: Wenxing Xi, Xiamen (CN); Jixiang Chen, Xiamen (CN); Xuhui Peng, Xiamen (CN); Qiaoning Zheng, Xiamen (CN); Hongyuan Huang, Xiamen (CN); Xiaolin Wang, Xiamen (CN); Wei Huang, Xiamen (CN)

(73) Assignee: Xiamen Tianma Optoelectronics Co., Ltd., Xiamen (CN)

( * ) Notice: Subject to any disclaimer, the term of this patent is extended or adjusted under 35 U.S.C. 154(b) by 90 days.

(21) Appl. No.: 18/647,149

(22) Filed: Apr. 26, 2024

(65) Prior Publication Data

US 2024/0280850 A1      Aug. 22, 2024

(30) Foreign Application Priority Data

Dec. 29, 2023    (CN) .......................... 202311873246.5

(51) Int. Cl.
| | |
|---|---|
| *G02F 1/1335* | (2006.01) |
| *G02F 1/1333* | (2006.01) |
| *G02F 1/1362* | (2006.01) |
| *G02F 1/1368* | (2006.01) |

(52) U.S. Cl.
CPC .... *G02F 1/133502* (2013.01); *G02F 1/13338* (2013.01); *G02F 1/136209* (2013.01); *G02F 1/136286* (2013.01); *G02F 1/1368* (2013.01); *G02F 1/133514* (2013.01)

(58) Field of Classification Search
None
See application file for complete search history.

(56) References Cited

U.S. PATENT DOCUMENTS 9,465,495 B2 * 10/2016 Park ...................... G06F 3/0412

FOREIGN PATENT DOCUMENTS

| CN | 108565246 A | 9/2018 |
|---|---|---|
| CN | 108873520 A | 11/2018 |
| CN | 112466931 A | 3/2021 |
| CN | 114721182 A | 7/2022 |

* cited by examiner

*Primary Examiner* — Dung T Nguyen
(74) *Attorney, Agent, or Firm* — KDW FIRM PLLC

(57) ABSTRACT

Provided are a display panel and a preparation method thereof and a display device. The display panel includes an array substrate, where the array substrate includes a first base, a first signal wire layer located on a side of the first base and an anti-reflection layer located between the first signal wire layer and the first base. The display panel further includes a display region and a non-display region; the first signal wire layer includes a first signal wire located in the display region, and the anti-reflection layer includes a first anti-reflection structure located in the display region and a second anti-reflection structure located in the non-display region. An orthographic projection of the first anti-reflection structure on a plane where the first base is located covers at least part of an orthographic projection of the first signal wire on the plane where the first base is located.

20 Claims, 10 Drawing Sheets

B

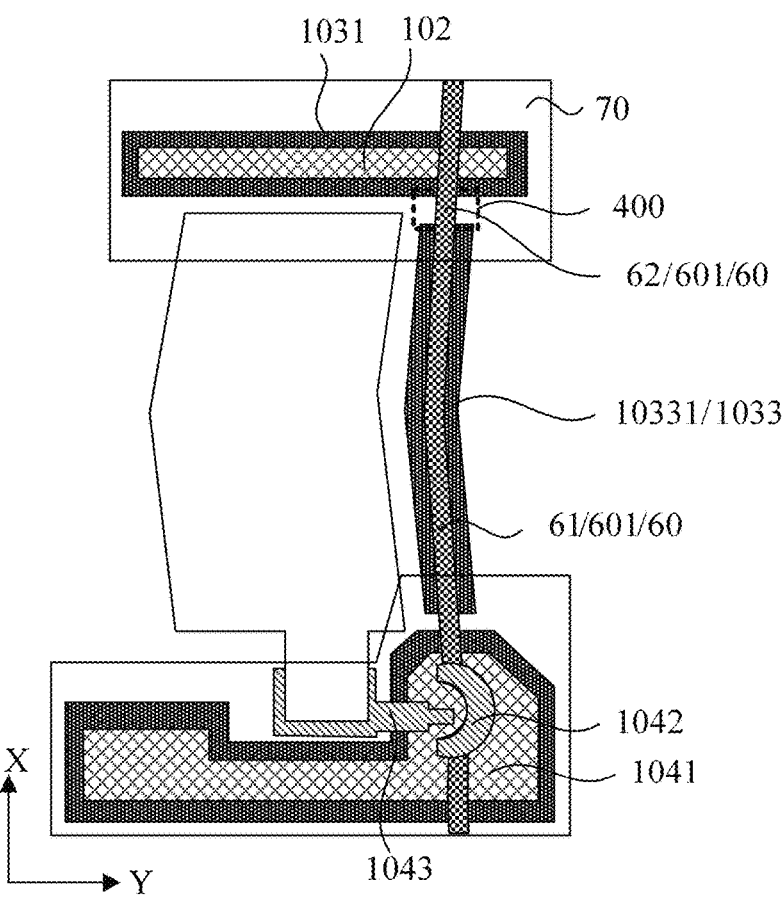

FIG. 12

| | |
|---|---|
| Provide a first base, and sequentially prepare an anti-reflection layer and a first signal wire layer on a side of the first base | S101 |
| Pattern the anti-reflection layer and the first signal wire layer to form, in the anti-reflection layer, a first anti-reflection structure located in a display region and a second anti-reflection structure located in a non-display region and form, in the first signal wire layer, a first signal wire located in the display region | S102 |

FIG. 13

Provide a first base, and sequentially prepare an anti-reflection layer and a first signal wire layer on a side of the first base    S401

Pattern the anti-reflection layer and the first signal wire layer in the same grayscale mask process so that a first anti-reflection sub-structure located in the non-display region and a second anti-reflection sub-structure located in the non-display region are formed in the anti-reflection layer, where the second anti-reflection sub-structure is located on a side of the first anti-reflection sub-structure facing an edge of the first base, and a first gap exists between the first anti-reflection sub-structure and the second anti-reflection sub-structure    S402

FIG. 16

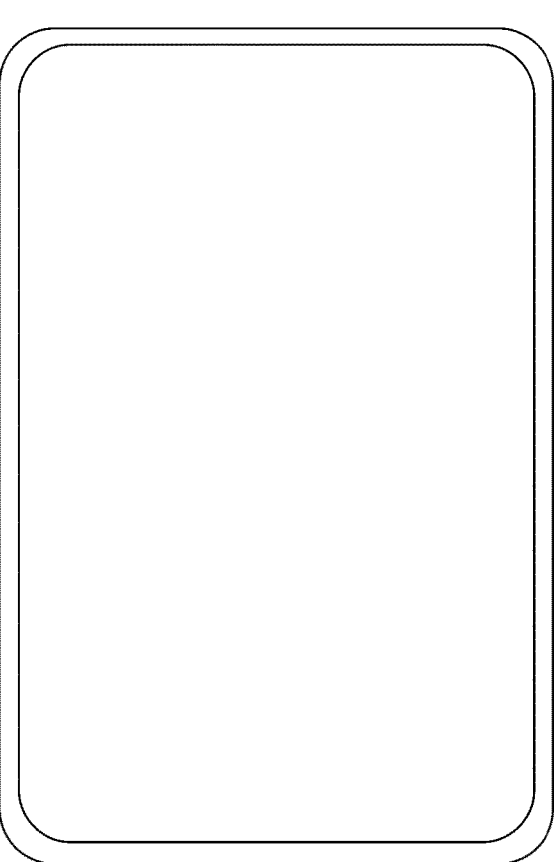

FIG. 17

DISPLAY PANEL, PREPARATION METHOD OF DISPLAY PANEL AND DISPLAY DEVICE

CROSS-REFERENCE TO RELATED APPLICATION(S)

This application claims priority to Chinese Patent Application No. 202311873246.5 filed with the China National Intellectual Property Administration (CNIPA) on Dec. 29, 2023, the disclosure of which is incorporated herein by reference in its entirety.

TECHNICAL FIELD

Embodiments of the present disclosure relate to the field of display technologies and, in particular, a display panel, a preparation method of a display panel and a display device.

BACKGROUND

In the field of full screen technologies, to achieve a narrow bezel of a display panel and implement miniaturization and lightness of the display panel, the array substrate is set on the side of the display panel facing the human eyes. In addition, mosaic processing is often performed on black matrices (BM) in the non-display region to alleviate the problems of white edges and metal bright edges of the display panel. However, since there is still a certain white region left after the mosaic processing is performed on the black matrices, the problems of white edges and metal bright edges of the display panel cannot be alleviated well. Moreover, if the array substrate is set on the side facing the human eyes, the problem of the reflection of metal in the display region is serious.

SUMMARY

Embodiments of the present disclosure provide a display panel, a preparation method of a display panel and a display device to alleviate the reflection of metal in the display region and the non-display region and improve the display performance of the display panel.

The embodiments of the present disclosure provide a display panel. The display panel includes an array substrate.

The array substrate includes a first base, a first signal wire layer located on a side of the first base, and an anti-reflection layer located between the first signal wire layer and the first base.

The display panel further includes a display region and a non-display region; the first signal wire layer includes a first signal wire located in the display region, and the anti-reflection layer includes a first anti-reflection structure located in the display region and a second anti-reflection structure located in the non-display region.

An orthographic projection of the first anti-reflection structure on a plane where the first base is located covers at least part of an orthographic projection of the first signal wire on the plane where the first base is located.

The embodiments of the present disclosure further provide a preparation method of a display panel. The method includes the steps described below.

A first base is provided, and an anti-reflection layer and a first signal wire layer are sequentially prepared on a side of the first base.

The anti-reflection layer and the first signal wire layer are patterned, a first anti-reflection structure located in a display region and a second anti-reflection structure located in a non-display region are formed in the anti-reflection layer, and a first signal wire located in the display region is formed in the first signal wire layer, where an orthographic projection of the first anti-reflection structure on a plane where the first base is located covers at least part of an orthographic projection of the first signal wire on the plane where the first base is located.

The embodiments of the present disclosure further provide a display device. The display device includes the above-mentioned display panel.

BRIEF DESCRIPTION OF DRAWINGS

FIG. 12 is an enlarged view of region B in the display panel of FIG. 1;

FIG. 13 is a flowchart of a preparation method of a display panel according to an embodiment of the present disclosure;

FIG. 16 is a flowchart of another preparation method of a display panel according to an embodiment of the present disclosure; and FIG. 17 is a structural diagram of a display device according to an embodiment of the present disclosure.

DETAILED DESCRIPTION

Figure 1:
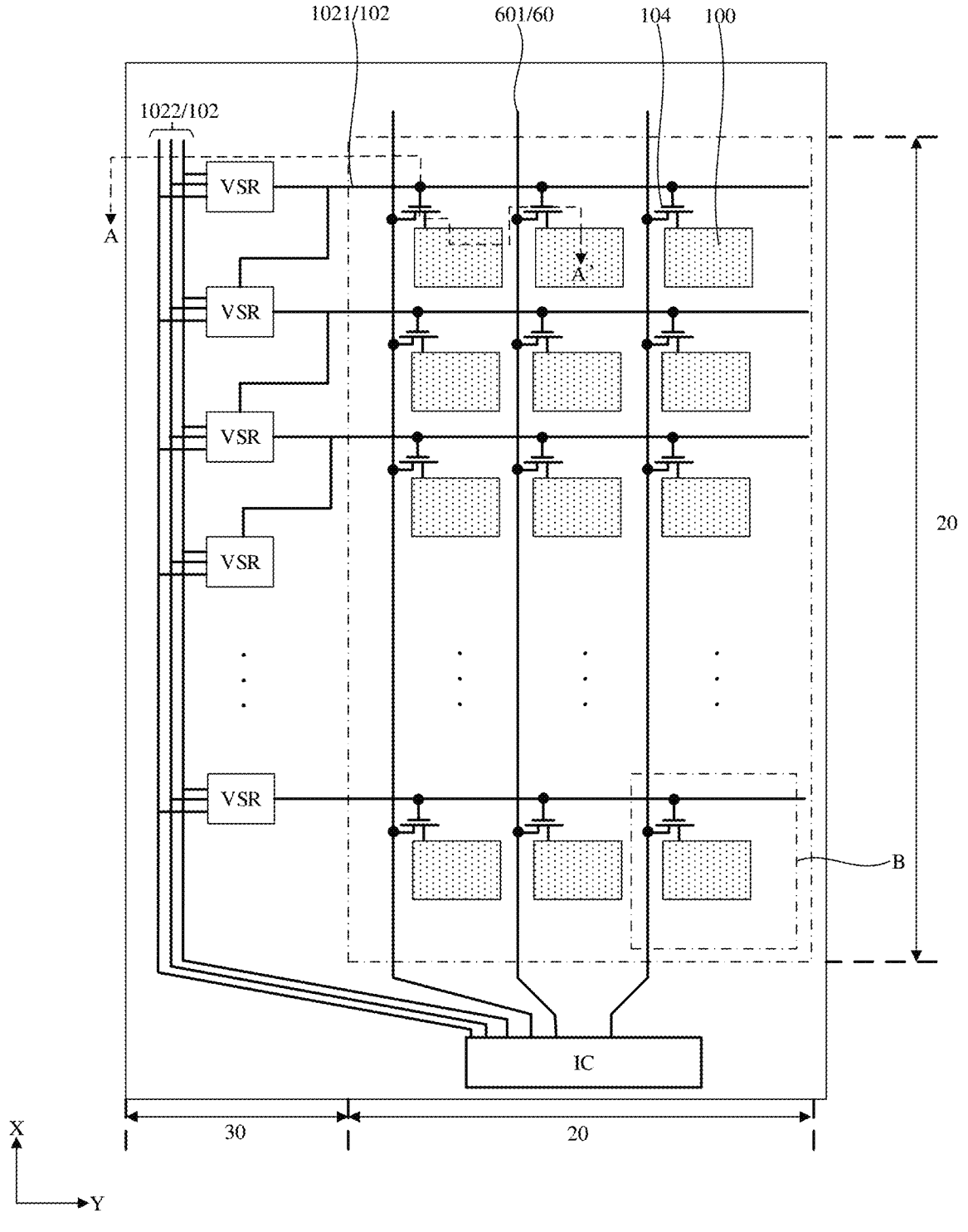
FIG. 1 is a top view of a display panel according to an embodiment of the present disclosure.

The present disclosure is described in detail hereinafter in conjunction with drawings and embodiments. It is to be understood that the embodiments described herein are intended to illustrate the present disclosure and not to limit the present disclosure. Additionally, it is to be noted that for ease of description, only part, not all, of structures related to the present disclosure are illustrated in the drawings.

It is found by the inventor that in the related art, for the four-narrow bezel scheme, an array substrate is generally set on the side facing the human eyes, that is, a color film substrate, a liquid crystal layer and the array substrate are sequentially disposed in a direction facing away from a backlight module so that narrow bezels are achieved. Generally, mosaic processing is performed on black matrices in a non-display region of the display panel, that is, multiple black matrix blocks are spliced to alleviate the white edges and metal bright edges of the display panel. However, black matrices of different shapes are spliced to form a black matrix mosaic, resulting in a gap of 10 μm to 12 μm between black matrix blocks, that is, a certain white region exists. Even if ink is applied at the circumference, the reflection of metal in the non-display region still cannot be solved. In addition, due to the lack of a light-shielding structure between metal wires in the display region and the glass substrate, severe reflection of metal exists in the display region.

On the basis of the preceding research, the inventor further develops technical schemes in the embodiments of the present disclosure. A first anti-reflection structure is disposed in the display region, and the first anti-reflection structure covers a signal wire in the display region, so the reflection of metal can be alleviated. Moreover, a second anti-reflection structure is disposed in the non-display region, and the second anti-reflection structure covers a display driver unit and a display drive signal line which are located in the non-display region, so the reflection of metal and white edges of the non-display region can be alleviated, and thus the display performance of the display panel can be improved.

The preceding is the core idea of the present disclosure. The technical schemes of embodiments of the present disclosure are described clearly and completely hereinafter in conjunction with drawings in the embodiments of the present disclosure. Based on the embodiments of the present disclosure, all other embodiments obtained by those of ordinary skill in the art without any creative effort are within the scope of the present disclosure.

Figure 2:
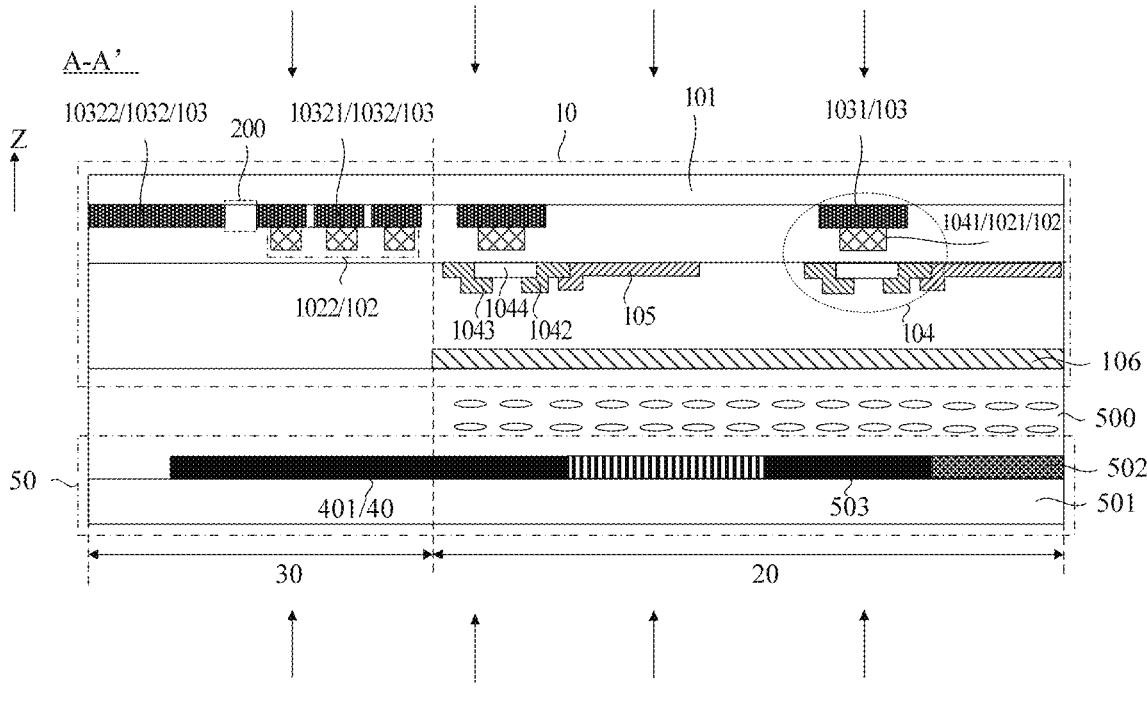
FIG. 2 is a sectional view of the display panel of FIG. 1 taken along section line A-A'.

FIG. 1 is a top view of a display panel according to an embodiment of the present disclosure, and FIG. 2 is a sectional view of the display panel of FIG. 1 taken along A-A'. As shown in FIG. 1 and FIG. 2, the display panel includes an array substrate 10. The array substrate 10 includes a first base 101, a first signal wire layer 102 located on a side of the first base 101, and an anti-reflection layer 103 located between the first signal wire layer 102 and the first base 101. The display panel further includes a display region 20 and a non-display region 30; the first signal wire layer 102 includes a first signal wire 1021 located in the display region 20, and the anti-reflection layer 103 includes a first anti-reflection structure 1031 located in the display region 20 and a second anti-reflection structure 1032 located in the non-display region 30. An orthographic projection of the first anti-reflection structure 1031 on a plane where the first base 101 is located covers at least part of an orthographic projection of the first signal wire 1021 on the plane where the first base 101 is located.

The display panel may include the display region 20 and the non-display region 30. Multiple pixel units 100, pixel circuits 104 and signal wires may be disposed in the display region 20. The pixel circuits 104 are electrically connected to the pixel units 100 to provide display signals for the pixel units 100. The signal wires may be electrically connected to the pixel circuits 104 or used as signal wires for other auxiliary functions. For example, the signal wires include the first signal wire 1021 and a third signal wire 601. The first signal wire 1021 may be a scan signal wire, and the third signal wire 601 may be a data signal wire. The scan signal wire may provide a scan signal for a pixel circuit 104 to control a transistor in the pixel circuit 104 to be turned on or off. The data signal line may provide a data signal for a pixel circuit 104 to control a transistor in the pixel circuit 104 to write the data signal into a first electrode (a pixel electrode or an anode) in the pixel unit 100. In this manner, the normal light or light emission of the pixel unit 100 is achieved, and thus the display function of the display panel is achieved. Further, a display driver unit and a display drive signal line may be disposed in the non-display region 30. The display driver unit may include a driver chip (for example, an integrated circuit (IC) shown in the figure) and a pixel driver circuit (for example, a shift register circuit VSR shown in the figure). The driver chip is electrically connected to the third signal wire 601 and is configured to provide a signal such as a data signal required by the pixel unit 100 for display through the third signal wire 601. The display drive signal line may be, for example, a second signal wire 1022. The driver chip is further electrically connected to the display drive signal line. The display drive signal line is further electrically connected to the pixel driver circuit. The driver chip is also configured to provide a display drive signal for the display driver circuit through the display drive signal line, such as a high level signal VGH, a low level signal line VGL or a clock signal CKV required by the shift register circuit VSR for generating the scan signal. It is to be noted that the embodiments of the present disclosure do not limit the structures contained in the display region 20 and the non-display region 30. In addition to the structures mentioned in the preceding embodiments, in other implementations, the display region 20 and the non-display region 30 may further include other structures for achieving normal functions of the display panel. For example, the display region 20 may further include a touch electrode and a touch signal wire, and the touch signal wire may be used as the third signal wire. The non-display region may further include a touch driver chip (not shown in the figure). The touch signal wire is electrically connected to the touch electrode and the touch driver chip separately so that the normal touch function of the display panel is implemented. For example, the touch signal wire may provide a touch drive signal output by the touch driver chip for the touch electrode, and transmit a touch sensing signal obtained by the touch electrode through sensing to the touch driver chip. The touch driver chip may determine the touch position and/or the touch intensity according to the touch drive signal and the touch sensing signal.

Further, the display panel also includes the array substrate 10. The array substrate 10 includes the first base 101, the first signal wire layer 102 located on a side of the first base 101, and the anti-reflection layer 103 located between the first signal wire layer 102 and the first base 101. The first signal wire layer 102 is generally a metal wire layer and has relatively high reflectivity, so the anti-reflection layer 103 is disposed between the first base 101 and the first signal wire layer 102, and the orthographic projection of the first anti-reflection structure 1031 in the anti-reflection layer 103 on the plane where the first base 101 is located covers at least part of an orthographic projection of the first signal wire layer 102 on the plane where the first base 101 is located. In this manner, the first anti-reflection structure 1031 can absorb or scatter light incident on the first anti-reflection structure 1031, reducing or completely eliminating the light incident on the first signal wire layer 102, reducing the reflection of light on the surface of the first signal wire layer 102, and thus avoiding the case of light leakage of metal and surface whitening of the display panel caused by the reflected light of the first signal wire layer 102.

The first signal wire layer 102 includes the first signal wire 1021 located in the display region 20. The first signal wire 1021 may include a scan signal wire and a gate 1041 in the pixel circuit 104. The anti-reflection layer 103 includes the first anti-reflection structure 1031 located in the display region 20 and the second anti-reflection structure 1032 located in the non-display region 30. The orthographic projection of the first anti-reflection structure 1031 on the plane where the first base 101 is located covers at least part of the orthographic projection of the first signal wire 1021 on the plane where the first base 101 is located. That is, the first anti-reflection structure 1031 is disposed in the display region 20, and the orthographic projection of the first anti-reflection structure 1031 partially or completely covers the first signal wire 1021, so the phenomenon of display whitening caused by the reflection of the first signal wire 1021 can be reduced. The display driver unit and the display drive signal line may generally be disposed in the non-display region 30 of the display panel, that is, metal structures are also disposed in the non-display region 30. The surface of these metal structures has relatively high glossiness, the metal structures have relatively high reflectivity and may reflect some light, and the phenomenon of reflection of metal also occurs in the non-display region 30. Therefore, the second anti-reflection structure 1032 disposed in the non-display region 30 can cover at least part of the metal structures, that is, an orthographic projection of the second anti-reflection structure 1032 on the plane where the first base 101 is located covers an orthographic projection of the display driver unit and/or an orthographic projection of the display drive signal line on the plane where the first base 101 is located, so the reflection of metal in the non-display region can be alleviated. It is to be understood that the first anti-reflection structure 1031 located in the display region 20 and the second anti-reflection structure 1032 located in the non-display region 30 are disposed in the same layer. On the one hand, this setting manner is simple, and on the other hand, the second anti-reflection structure 1032 can fully block the metal wires of the non-display region 30, which can avoid the reflection of the second signal wire 1022 in the non-display region 30.

Moreover, referring to FIG. 2, the light emission direction of the display panel is along direction Z shown in the figure. The array substrate 10 may be located on a side facing the light emission surface of the display panel, that is, the display panel emits light from the side of the array substrate 10. Taking a liquid crystal display panel as an example, the array substrate 10 is located on a side facing away from the backlight module, so the setting of four narrow bezels of the display panel can be implemented. It is to be noted that the narrow bezels in the embodiments of the present disclosure may be understood as that bezels are relatively narrow or no bezel exists, that is, the display panel is borderless. Moreover, the bezels in the embodiments of the present disclosure refer to encapsulation bezels of the display panel, such as iron bezels in the liquid crystal display panel. In addition, the bezels of the display panel are set to be relatively narrow or the display panel is set without any bezel, so the ratio of the area of the display region to the area of the entire panel region can be increased, the screen-to-body ratio of the display region can be increased, and thus the aperture rate of the display panel can be improved.

Figure 3:
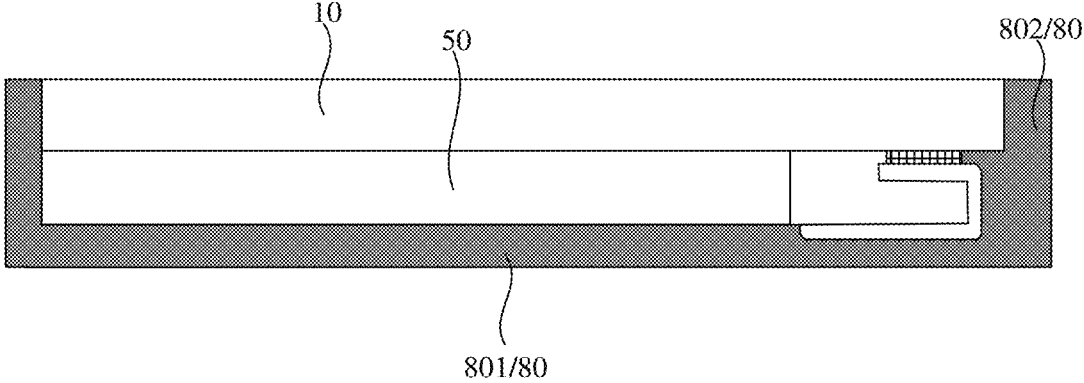
FIG. 3 is a side view of a display panel according to an embodiment of the present disclosure.

Further, FIG. 3 is a side view of a display panel according to an embodiment of the present disclosure. As shown in FIG. 3, in the scheme where the array substrate 10 may be located on the side facing the light emission surface of the display panel, a bezel structure 80 includes a main body portion 801 and a side surface portion 802. Along the thickness direction of the display panel, the main body portion 801 overlaps the array substrate 10, and the side surface portion 802 is connected to an edge region of the array substrate 10 but does not cover the array substrate 10. That is, when viewed from the side of the light emission surface of the display panel, the side surface portion 802 does not cover the array substrate 10. In this manner, when the array substrate 10 is located on the side facing the light emission surface of the display panel, the bezel of the display panel that the user sees is actually the edge of the first base 101 in the array substrate 10, or in other words, the edge of the first base 101 in the array substrate 10 plus the thickness part of the side surface portion 802. Since the array substrate 10 does not overlap the side surface portion 802 in the bezel structure 80, no bezel region corresponding to the side surface portion 802 in the bezel structure 80 exists in the array substrate 10. Therefore, when the array substrate 10 is located on the side facing the light emission surface of the display panel, the setting of four narrow bezels can be achieved.

Further, since the driver chip and a flexible printed circuit board structure need to bond with the array substrate 10, a bonding region inevitably exists on the array substrate 10. That is, the position of the corresponding bonding region of the array substrate extends beyond the coverage area of an opposing substrate, or in other words, the opposing substrate does not cover the bonding region of the array substrate. Therefore, when the opposing substrate is located on the side facing the light emission surface of the display panel, the bezel structure of the display panel is disposed at the position on the opposing substrate where the opposing substrate does not cover the bonding region of the array substrate, that is, the bezel structure of the display panel covers the bonding region, for example, forming a lower bezel region of the display panel. This scheme can be understood as a display panel with three narrow bezels.

Therefore, the display panel is set to emit light from the side of the array substrate 10, that is, the array substrate 10 is located on the upper film layer of the array substrate 10, so the proportion of bezel regions of the display panel can be reduced, and the beauty of the display panel can be improved. When the array substrate 10 is located on the side facing the light emission surface of the display panel, the metal wire structure in the array substrate 10, such as the first signal wire 1021, has a strong reflection effect on the external ambient light. In the embodiments of the present disclosure, the first anti-reflection structure 1031 is added between the first signal wire 1021 and the first base 101. The first anti-reflection structure 1031 has relatively low light reflectivity and relatively low light transmittance, that is, the first anti-reflection structure 1031 does not reflect much external ambient light and does not allow too much light to pass to the first signal wire 1021. In this manner, the strong reflection of light by the first signal wire 1021 can be prevented, the reflection issue of the display panel can be alleviated, the display contrast of the display panel can be improved, and the display effect can be enhanced.

Alternatively, along the light emission direction Z of the display panel, the array substrate 10 may also be disposed on a side facing away from the light emission side of the display panel. Taking a liquid crystal display panel as an example, the array substrate 10 is located on a side facing the backlight module, and this scheme is explained and illustrated subsequently in the description. The embodiments of the present disclosure do not limit the upper-lower film layer relationship between the array substrate 10 and the opposing substrate 50. The array substrate 10 may be located on the side facing the light emission side of the display panel, or the opposing substrate 50 is located on the side facing the light emission side of the display panel, as long as it is ensured that the anti-reflection structure is disposed in both the display region 20 and the non-display region 30 and covers at least part of the signal wire in the first signal wire layer 102 to avoid interference from light on the first signal wire layer 102 and reduce the reflection of light on the surface of the first signal wire layer 102.

It is to be understood that the orthographic projection of the first anti-reflection structure 1031 on the plane where the first base 101 is located covers at least part of the orthographic projection of the first signal wire 1021 on the plane where the first base 101 is located, that is, the first anti-reflection structure 1031 may cover part of the orthographic projection of the first signal wire 1021, so the first anti-reflection structure 1031 can block part of the reflection of metal of the first signal wire 1021. The first anti-reflection structure 1031 may fully cover the orthographic projection of the first signal wire 1021, and thus completely block the reflection of metal of the first signal wire 1021. In addition, due to alignment of the array substrate 10 with the opposing substrate 50 during the preparation process of the display panel, the more the positions where the black matrices are disposed, the higher the required alignment precision. Therefore, by using the first anti-reflection structure 1031 to block the first signal wire 1021, the requirements for the alignment precision between the array substrate 10 and the opposing substrate 50 can be reduced, and the alignment efficiency can be improved.

Exemplarily, the first base 101 may be a rigid base or a flexible base, and the embodiments of the present disclosure do not limit the type of the first base 101.

Exemplarily, the material of the anti-reflection layer 103 may include a metal oxide material. The metal oxide has a relatively loose internal structure, and the path of light irradiating on the metal oxide may be changed, resulting in diffuse reflection of light. Moreover, the metal oxide also has a good light absorption effect and relatively low light transmittance. Therefore, the anti-reflection layer containing the metal oxide material and disposed between the first signal wire and the external ambient light can reduce the amount of light irradiating on the first signal wire, and thus the reflection of the first signal wire can be reduced. The anti-reflection layer containing the metal oxide material has relatively low reflectivity, so when the external ambient light irradiates on the anti-reflection layer, the light reflected by the anti-reflection layer is less. Exemplarily, the anti-reflection layer 103 may be made of a material such as molybdenum oxide or chromium oxide, or may use another material with low transmittance and low reflectivity.

According to the display panel provided in the embodiments of the present disclosure, the first anti-reflection structure is disposed in the display region, the second anti-reflection structure is disposed in the non-display region, and the orthographic projection of the first anti-reflection structure on the plane where the first base is located covers at least part of the orthographic projection of the first signal wire on the plane where the first base is located, so the first anti-reflection structure can cover part or all of the first signal wire, and thus the reflection of metal in the display region can be alleviated. Moreover, the second anti-reflection structure located in the non-display region can alleviate the reflection of metal in the non-display region, so the performance of the display panel can be further improved. In addition, a black light absorption layer

401 is disposed on the opposing substrate 50, and an orthographic projection of the black light absorption layer 401 on the plane where the first base 101 is located covers the orthographic projection of the first anti-reflection structure 1031 and the orthographic projection of the second anti-reflection structure 1032 on the plane where the first base 101 is located. In this manner, light leakage at the gap position of the anti-reflection structures can be avoided, and the black light absorption layer 401 can also prevent light leakage caused by the irradiation of backlight light on the pixel circuit 104.

In an embodiment, with continued reference to FIG. 1 and FIG. 2, the first signal wire layer 102 further includes a second signal wire 1022 located in the non-display region. The second anti-reflection structure 1032 includes a first anti-reflection sub-structure 10321 and a second anti-reflection sub-structure 10322, the second anti-reflection sub-structure 10322 is located on a side of the first anti-reflection sub-structure 10321 facing an edge of the first base 101, a first gap 200 exists between the first anti-reflection sub-structure 10321 and the second anti-reflection sub-structure 10322, and the first gap 200 penetrates through the anti-reflection layer 103. An orthographic projection of the first anti-reflection sub-structure 10321 on the plane where the first base 101 is located covers an orthographic projection of the second signal wire 1022 on the plane where the first base 101 is located.

The second signal wire 1022 is located in the non-display region 30. Exemplarily, the second signal wire 1022 may be a signal wire for providing a signal for a pixel driver circuit (such as the VSR in the figure) disposed in the non-display region 30. For example, the second signal wire 1022 may provide a high level signal VGH, a low level signal line VGL or a clock signal CKV required by the shift register circuit VSR for generating a scan signal. Correspondingly, the orthographic projection of the second anti-reflection structure 1032 on the plane where the first base 101 is located covers the orthographic projection of the second signal wire 1022 on the plane where the first base 101 is located, which ensures that the second anti-reflection structure 1032 can absorb or scatter the light incident on the second anti-reflection structure 1032, reduces or completely eliminates the light incident on the second signal wire 1022, reduces the reflection of light on the surface of the second signal wire 1022, and thus avoids surface whitening in the non-display region 30.

The second anti-reflection structure 1032 includes the first anti-reflection sub-structure 10321 and the second anti-reflection sub-structure 10322, the second anti-reflection sub-structure 10322 is located on the side of the first anti-reflection sub-structure 10321 facing an edge of the first base 101, the orthographic projection of the first anti-reflection sub-structure 10321 on the plane where the first base 101 is located covers the orthographic projection of the second signal wire 1022 on the plane where the first base 101 is located, the first gap 200 exists between the first anti-reflection sub-structure 10321 and the second anti-reflection sub-structure 10322, and the first gap 200 penetrates through the anti-reflection layer 103, that is, the first anti-reflection sub-structure 10321 and the second anti-reflection sub-structure 10322 are disconnected to form the first gap 200. Exemplarily, the width of the first gap 200 may be 20 μm. In this manner, the static electricity generated when cutting is performed on one side of the edge of the first base 101 can be stopped at the position of the first gap 200, which can prevent the transmission of the static electricity to the first anti-reflection sub-structure 10321 through the second anti-reflection sub-structure 10322 and the further transmission of the static electricity to the first anti-reflection structure 1031 through the first anti-reflection sub-structure 10321 during a live operation of cutting the display panel along the cutting line. That is, the static electricity can be prevented from extending to the second signal wire 1022 in the non-display region 30 and the first signal wire 1021 in the display region 20, so the impact on signals in the second signal wire 1022 and the first signal wire 1021 can be avoided, and the normal operation of the display panel can be ensured without static interference.

Figure 4:
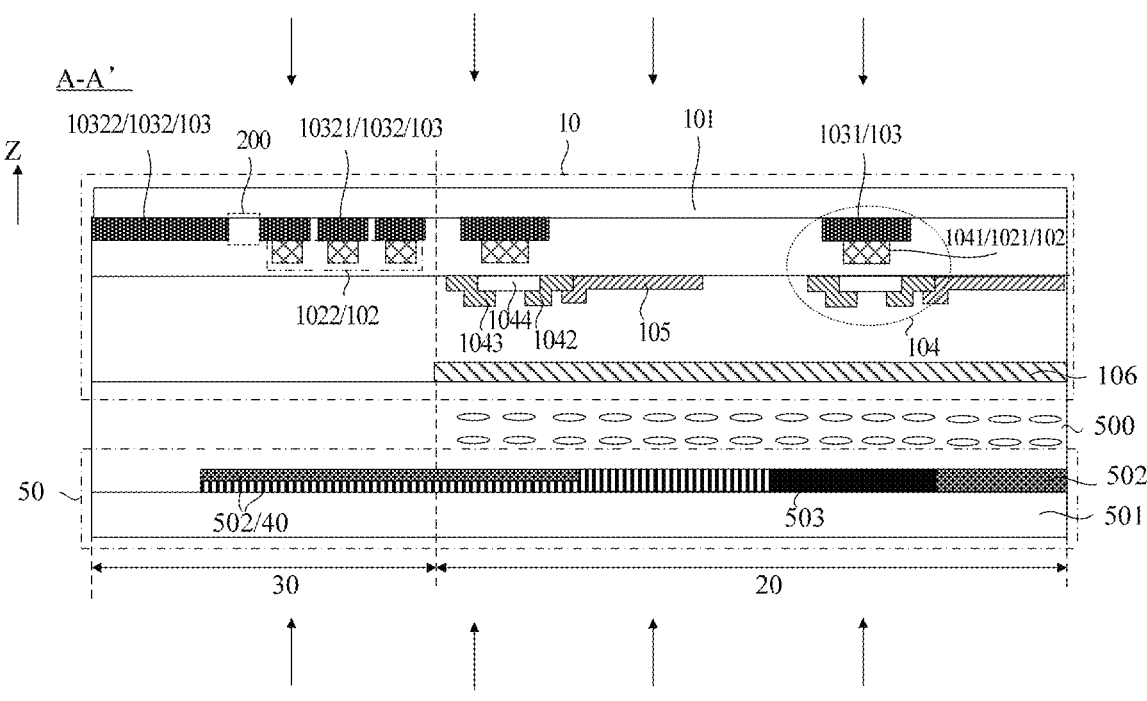
FIG. 4 is another sectional view of the display panel of FIG. 1 taken along A-A'.

In an embodiment, FIG. 4 is another sectional view of the display panel of FIG. 1 taken along A-A'. Referring to FIG. 2 and FIG. 4, the display panel further includes a light absorption layer 40 located on a side of the anti-reflection layer 103 facing away from the first base 101. An orthographic projection of the light absorption layer 40 on the plane where the first base 101 is located covers an orthographic projection of the first gap 200 on the plane where the first base 101 is located.

The light absorption layer 40 is located on the side of the anti-reflection layer 103 facing away from the first base 101, that is, the light absorption layer 40 is located on the other side of the array substrate 10 facing away from the first base 101. The orthographic projection of the light absorption layer 40 on the plane where the first base 101 is located covers the orthographic projection of the first gap 200 on the plane where the first base 101 is located, that is, the light absorption layer 40 can block the first gap 200, preventing the whitening phenomenon in the non-display region 30 caused by light leakage of the first gap 200. Moreover, the setting of the light absorption layer 40 can also ensure that the setting region of the anti-reflection layer 103 and the setting region of the light absorption layer 40 in the display panel have the same or similar light absorption or reflection effects, and a good optical consistency of the display panel can be ensured.

Exemplarily, the width of an overlapping between the orthographic projection of the light absorption layer 40 on the plane where the first base 101 is located and an orthographic projection of the second anti-reflection sub-structure 10322 on the plane where the first base 101 is located may be 30 μm, that is, the absorption layer 40 covers an edge of the second anti-reflection sub-structure 10322. In this manner, the light absorption layer 40 can fully cover the first gap 200, enhancing the suppression effect on light leakage of the first gap 200.

In a feasible implementation, with continued reference to FIG. 2, the display panel further includes an opposing substrate 50 located on a side of the array substrate 10, the opposing substrate 50 includes a second base 501. The light absorption layer 40 includes a black light absorption layer 401 located in the opposing substrate 50, and the black light absorption layer 401 is located on a side of the second base 501 facing the array substrate 10.

As shown in FIG. 2, the display panel further includes the opposing substrate 50 located on the side of the array substrate 10, and the opposing substrate 50 may be a color film substrate. Light-filtering structures 502 and black matrices 503 located between light-filtering structures 502 having different colors are disposed on the opposing substrate 50, and the light-filtering structures 502 can filter light of different colors, so the color display effect of the display panel can be achieved. The black matrix 503 can avoid color mixing between adjacent light-filtering structures 502, and improve the display effect of the display panel. It is to be noted that FIG. 2 only illustrates an example where the display panel is a liquid crystal display panel. It is to be understood that the opposing substrate may also be disposed in other types of display panels. For example, an organic light-emitting display panel also includes the opposing substrate 50, and the opposing substrate 50 includes light-filtering structures 502 and black matrices 503 to ensure the display effect.

The black light absorption layer 401 may be a film layer formed by a black material that can absorb light. In this manner, the black light absorption layer 401 can absorb the light passing through the first gap 200, thereby avoiding the whitening phenomenon of the non-display region 30 caused by light leakage of the first gap 200. Further, with continued reference to FIG. 2, the black light absorption layer 401 and the black matrices 503 may be disposed in the same layer and are prepared through the same process, ensuring that the setting manner of the black light absorption layer 401 is simple.

In another feasible implementation, with continued reference to FIG. 4, the display panel further includes an opposing substrate 50 located on a side of the array substrate 10, and the opposing substrate 50 includes a second base 501. The light absorption layer 40 includes light-filtering structures 502 having at least two different colors, the light-filtering structures 502 are arranged to be stacked in the opposing substrate 50, and the light-filtering structures 502 are located on a side of the second base 501 facing the array substrate 10.

The light-filtering structures 502 can achieve the filtering effect on light of different colors, thus achieving the color display effect of the display panel. The light-filtering structures 502 having at least two different colors are stacked, so after light enters a light-filtering structure 502 having a first color through the first gap 200, only one color light can pass, while the one color light cannot pass through a light-filtering structure 502 having a second color. Therefore, the light filtering effect can be achieved, and the light leakage of the display panel caused by light passing through the first gap 200 can be prevented.

Further, the light-filtering structures 502 in the display panel may include a red light-filtering structure, a green light-filtering structure and a blue light-filtering structure, so the normal color display function of the display panel can be achieved. Exemplarily, the light-filtering structures 502 of at least two different colors in the embodiments of the present disclosure may be a blue light-filtering structure and a red light-filtering structure which are stacked. In this manner, after light passes through the first gap 200 and enters the blue light-filtering structure, only blue light can pass, while the blue light cannot pass through the red light-filtering structure, so the light filtering effect can be achieved, and the light leakage of the display panel caused by light passing through the first gap 200 can be prevented. Further, due to the significant difference in the wavelength between the light filtered by the blue light-filtering structure and the light filtered by the red light-filtering structure, no light can pass through both the blue light-filtering structure and the red light-filtering structure. Therefore, the light-filtering structures having at least two different colors are set as the blue light-filtering structure and the red light-filtering structure which are disposed to be stacked so that the light filtering effect can be improved, and the light absorption effect of the light absorption layer can be ensured.

Figure 5:
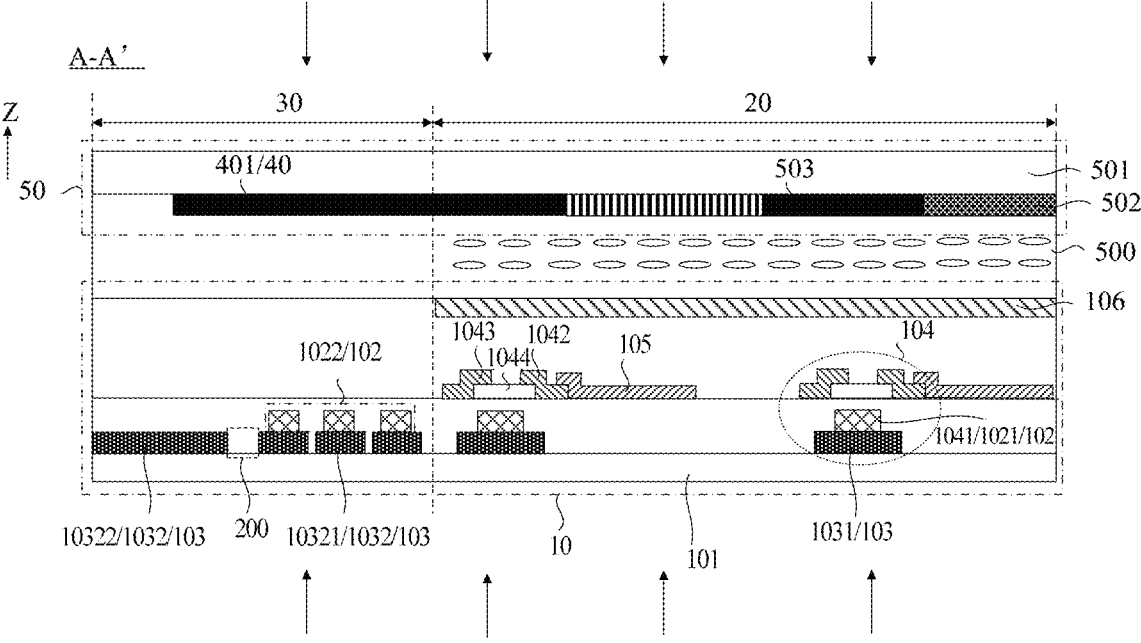
FIG. 5 is another sectional view of the display panel of FIG. 1 taken along A-A'.

Further, FIG. 5 is another sectional view of the display panel of FIG. 1 taken along A-A'. Referring to FIG. 2 and FIG. 4, the display panel further includes an opposing substrate 50. The opposing substrate 50 is located on a side of the array substrate 10 facing away from the light emission side of the display panel, such as a display panel having four narrow bezels. Alternatively, as shown in FIG. 5, the opposing substrate 50 is located on a side of the array substrate 10 facing the light emission side of the display panel, such as a display panel having three narrow bezels or a display panel having two narrow bezels.

On the basis of the preceding embodiments, with continued reference to FIG. 2, FIG. 4 and FIG. 5, the array substrate 10 further includes a pixel circuit 104, a first electrode 105 and a second electrode 106 which are located on a side of the first base 101 facing the opposing substrate 50. The pixel circuit 104 includes a thin-film transistor, the thin-film transistor includes a gate 1041, a source 1042 and a drain 1043, the gate 1041 is located in the first signal wire layer 102, and the source 1042 or the drain 1043 is electrically connected to and in contact with the first electrode 105. The opposing substrate 50 includes a second base 501, and a light-filtering structure 502 and black matrices 503 which are located on a side of the second base 501 facing the array substrate 10.

FIG. 2, FIG. 4 and FIG. 5 illustrate an example where the display panel includes a liquid crystal display panel. The display panel includes the array substrate 10, the opposing substrate 50 and a liquid crystal layer 500 located between the array substrate 10 and the opposing substrate 50. The array substrate 10 includes multiple pixel circuits 104 arranged in an array. The pixel circuits 104 are configured to receive scan signals and to be turned on or off under the action of the scan signals, so as to provide data signals provided by the data signal wires for the pixel units 100 or stop providing data signals for the pixel units 100. A pixel circuit 104 may include one or more thin-film transistors. For example, in a liquid crystal display panel, the pixel circuit 104 may include one thin-film transistor. For example, in an organic light-emitting display panel, the pixel circuit 104 may include at least two thin-film transistors and at least one storage capacitor, The pixel circuit 104 may be a "2T1C" structure pixel circuit or a "7T1C" structure pixel circuit, where "T" represents a thin-film transistor and "C" represents a storage capacitor. The composition manner of the pixel circuit 104 is not limited in the embodiments of the present disclosure, and may be limited according to the requirements and the type of the display panel. Further, the thin-film transistor may include a gate 1041, a source 1042, a drain 1043 and an active layer 1044. The gate 1041 is disposed corresponding to a channel region of the active layer 1044, the source 1042 is disposed corresponding to a source region of the active layer 1044, and the drain 1043 is disposed corresponding to a drain region of the active layer 1044. Under the action of a gate signal, the channel region is turned on and is transformed from a non-conductive state to a conductive state, a corresponding path is formed between the source 1042 and the drain 1043; thus, the data signal can be written into the drain 1043 sequentially through the source 1042 and the channel region. Further, the gate 1041 provided in the embodiments of the present disclosure may be located on a side of the active layer 1044 facing the first base 101, that is, the gate 1041 may be a bottom gate. In this manner, the gate 1041 may serve as a light-shielding structure for the channel region, avoiding light entering the channel region and forming a light leakage flow. Further, the array substrate 10 may further include a first electrode 105 and a second electrode 106. Taking a liquid crystal display panel as an example, the first electrode 105 may be a pixel electrode, and the second electrode 106 may be a common electrode. Taking an organic light-emitting display panel as an example, the first electrode 105 may be an anode, and the second electrode 106 may be a cathode. The data signal is transmitted to the first electrode 105 through the pixel circuit 104, and simultaneously, a common potential signal is input to the second electrode 106 so that the driving of liquid crystals or the organic light-emitting layer is achieved, and the normal light emission display of the display panel is ensured.

Further, the opposing substrate 50 includes multiple light-filtering structures 502 and multiple black matrices 503 disposed at intervals. The light-filtering structures 502 may include a red light-filtering structure, a green light-filtering structure and a blue light-filtering structure to achieve the color display function of the display panel. A black matrix 503 is disposed between two adjacent light-filtering structures 502 to avoid a color mixture of light emission of light emitted from different light-filtering structures and ensure the display effect of the display panel.

It is to be understood that taking a display panel with four narrow bezels as an example, in light shown in FIG. 2 and FIG. 4, light between the array substrate 10 and the user's eyes is the ambient light, while light on a side of the opposing substrate 50 facing away from the array substrate 10 is the backlight emitted from the backlight module. Taking a display panel with three narrow bezels or two narrow bezels as an example, in light shown in FIG. 5, light between the opposing substrate 50 and the user's eyes is the ambient light, while light on a side of the array substrate 10 facing away from the opposing substrate 50 is the backlight emitted from the backlight module.

With continued reference to FIG. 2, the second anti-reflection structure 1032 extends to an edge of the first base 101.

In a comparative example, black matrices of different shapes are spliced to form a black matrix mosaic in the related art, resulting in a gap of 10 μm to 12 μm between black matrix blocks, that is, a certain white region still exists. Moreover, although the use of ink coating at the circumference can alleviate the reflection of metal of the display region 20 and the non-display region 30 to some extent, the alignment operation needs to be performed on the ink and the coverage region to ensure good coverage effect of the ink on the coverage region, which may result in an alignment error, for example, 3 μm. Due to the alignment error, the area of the non-display region 30 is increased. In the embodiments of the present disclosure, the second anti-reflection structure 1032 extends to the edge of the first base 101, that is, the second anti-reflection structure 1032 can completely cover the second metal wire 1022 of the non-display region 30. In this manner, on the one hand, the reflection of metal in the non-display region 30 can be further avoided, and light leakage at the edges of the display panel can be avoided. On the other hand, the second anti-reflection structure 1032 extending to the edge of the first base 101 is disposed in the same layer as the first anti-reflection structure 1031 located in the display region, thus for the anti-reflection structures prepared through the same process, it is not necessary to consider the alignment with reflective structures (such as the metal wire in the non-display region) in the non-display region during the preparation process of the anti-reflection structures, thus the alignment precision is not considered, and no alignment error exists so that the area of the non-display region 30 can be reduced, the display screen-to-body ratio of the display panel can be increased, and the good display effect can be ensured.

Exemplarily, the second anti-reflection structure 1032 may extend beyond the edge of the first substrate 101 by 100 μm, which can prevent an insufficient edge due to fluctuations in a cutting process when the display panel is cut along the cutting line.

Figure 6:
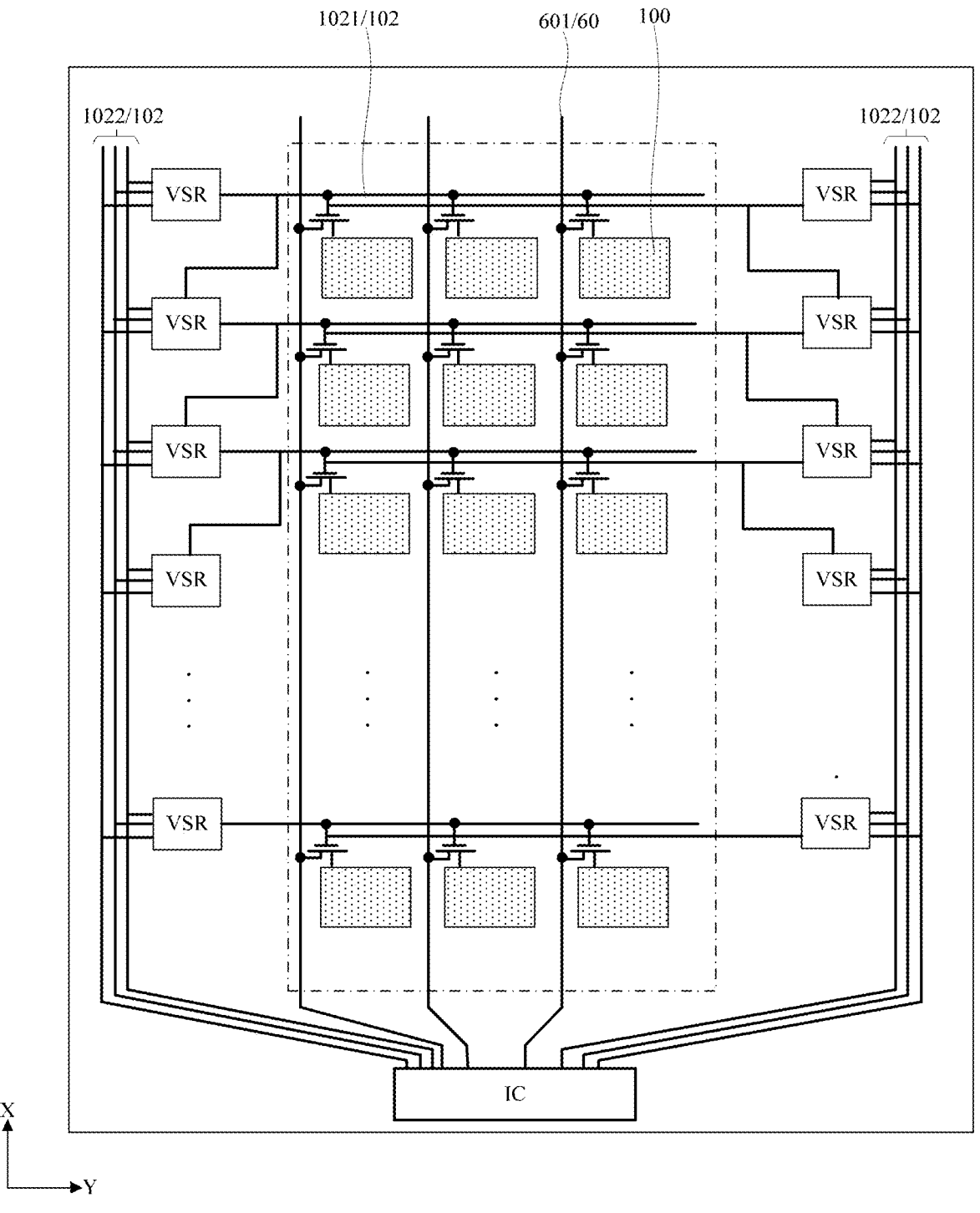
FIG. 6 is a top view of another display panel according to an embodiment of the present disclosure.
Figures 7, 8:
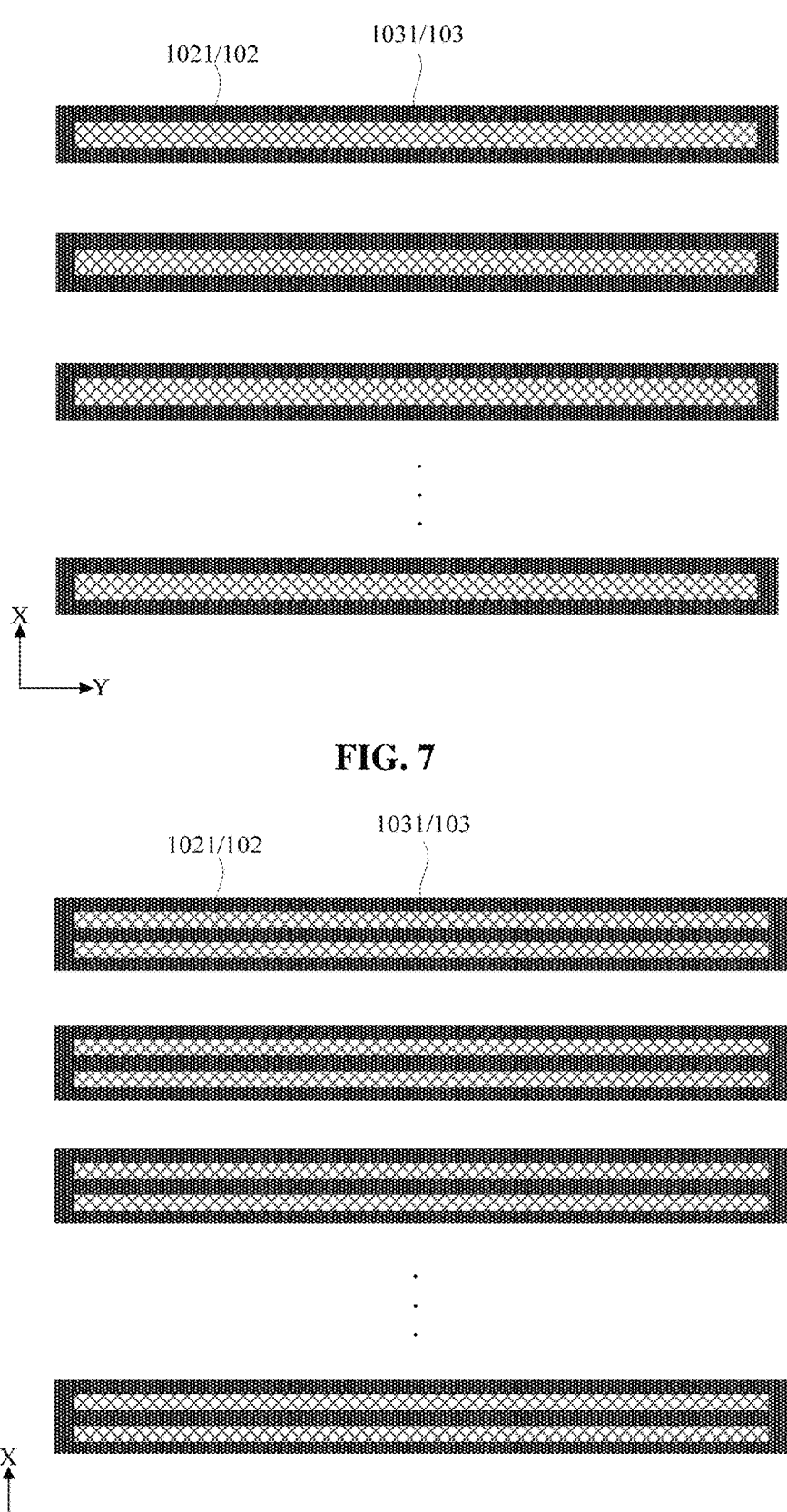
FIG. 7 is a structural view of a first anti-reflection structure and a first signal wire in a display panel according to an embodiment of the present disclosure.
FIG. 8 is a structural view of a first anti-reflection structure and a first signal wire in another display panel according to an embodiment of the present disclosure.

FIG. 6 is a top view of another display panel according to an embodiment of the present disclosure, FIG. 7 is a structural view of a first anti-reflection structure and a first signal wire in a display panel according to an embodiment of the present disclosure, and FIG. 8 is a structural view of a first anti-reflection structure and a first signal wire in another display panel according to an embodiment of the present disclosure. Referring to FIG. 1, FIG. 6, FIG. 7 and FIG. 8, the first signal wire layer 102 includes multiple first signal wires 1021, and the multiple first signal wires 1021 extend along a first direction (direction Y shown in FIG. 1) and are arranged along a second direction (direction X shown in FIG. 1), where the first direction Y intersects the second direction X. The anti-reflection layer 103 includes multiple first anti-reflection structures 1031, and the multiple first anti-reflection structures 1031 extend along the first direction Y and are arranged along the second direction X. The multiple first signal wires 1021 correspond to the multiple first anti-reflection structures 1031.

The multiple first signal wires 1021 may include a scan signal line configured to provide a scan signal for a pixel circuit 104 in the display panel to control the transistor in the pixel circuit 104 to be turned on or off so that it is controlled whether a display signal can be written into the pixel unit 100.

In a feasible implementation, with continued reference to FIG. 1 and FIG. 7, along the second direction X, one first signal wire 1021 is included between two adjacent rows of pixel units 100, that is, each first signal wire 1021 scans and drives each row of pixel units 100 separately. In this case, the first signal wires 1021 are in one-to-one correspondence with the first anti-reflection structures 1031, that is, one first anti-reflection structure 1031 may cover one first signal wire 1021. In this manner, the good correspondence between the first anti-reflection structures 1031 and the first signal wires 1021 can be ensured, and it can be ensured that the first anti-reflection structures 1031 can cover part or all of the first signal wires 1021, avoiding or reducing the reflection effect of the first signal wires 1021 on light.

In another feasible implementation, with continued reference to FIG. 6 and FIG. 8, along the second direction X, two first signal wires 1021 may be included between two adjacent rows of pixel units 100, that is, each row of pixel units 100 may correspond two first signal wires 1021, and the two first signal wires 1021 may scan and drive pixel units 100 from different sides of the display region 20, respectively. In this manner, delays in the scan signals received by pixel units 100 at different positions can be avoided, differences in the scan signals received by pixel units 100 at different positions due to signal loss can be avoided, and thus the consistency in the scan driving can be ensured. In this case, one first anti-reflection structure 1031 corresponds to two first signal wires, that is, one first anti-reflection structure 1031 can cover at least part of two first signal wires 1021. In this manner, the good correspondence between the first anti-reflection structures 1031 and the first signal wires 1021 can be ensured, the impact caused by a small interval between first signal wires 1021 on the setting difficulty of the first anti-reflection structures 1031 can be avoided, and the first anti-reflection structures 1031 can cover part or all of the first signal wires 1021, avoiding or reducing the reflection effect of the first signal wires 1021 on light.

Figure 9:
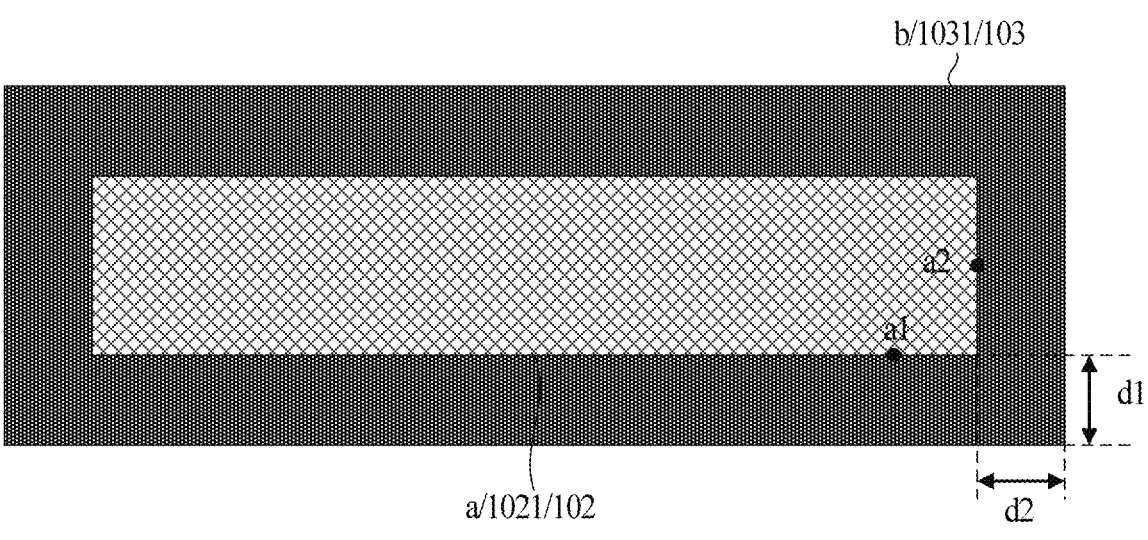
FIG. 9 is a structural view of a first anti-reflection structure and a first signal wire in another display panel according to an embodiment of the present disclosure.

FIG. 9 is a structural view of a first anti-reflection structure and a first signal wire in another display panel according to an embodiment of the present disclosure. As shown in FIG. 9, the shape of the first anti-reflection structure 1031 is similar to the shape of the first signal wire 1021. The first signal wire 1021 includes a first boundary a, and the first anti-reflection structure 1031 includes a second boundary b. Any two positions in the first boundary a include a first position a1 and a second position a2, the minimum distance between the first position a1 and the second boundary b is d1, and the minimum distance between the second position a2 and the second boundary b is d2, where $|d1-d2|/d1 \leq 10\%$.

The shape of the first anti-reflection structure 1031 is similar to the shape of the first signal wire 1021. It may be understood that the shape contour of the first anti-reflection structure 1031 is the same as the shape contour of the first signal wire 1021, but the shape size of the first anti-reflection structure 1031 is different from the shape size of the first signal wire 1021. For example, the shape size of the first anti-reflection structure 1031 is larger than the shape size of the first signal wire 1021. The first anti-reflection structure 1031 and the first signal wire 1021 may be prepared using the same half-tone mask (HTM) process. The HTM process forms two different film thicknesses by exposure according to partial transmittance characteristics of specific regions. By controlling the transmittance of different regions on the photomask substrate, on the one hand, the manner for preparing the first anti-reflection structure 1031 and the first signal wire 1021 is ensured to be simple and efficient; on the other hand, using only one photomask can implement patterning the anti-reflection layer 103 and the first signal wire layer 102, saving costs. Moreover, only one photomask is used for patterning the anti-reflection layer 103 and the first signal wire layer 102 in the same process, and no alignment process is required for the anti-reflection layer 103 and the first signal wire layer 102, thus no alignment deviation exists, and the coverage effect of the anti-reflection layer 103 on the first signal wire layer 102 is ensured.

It is to be understood that when the first anti-reflection structure 1031 and the first signal wire 1021 are prepared by using the HTM, in an ideal state, the minimum distances between any two positions in the first boundary a of the first signal wire 1021 and two corresponding positions in the second boundary b of the first anti-reflection structure 1031 are approximately the same. That is, the first boundary a includes the first position a1 and the second position a2, and the minimum distance d1 between the first position a1 and the second boundary b and the minimum distance d2 between the second position a2 and the second boundary b satisfy that $|d1-d2|/d1 \leq 10\%$, which is consistent with the process of preparing the first anti-reflection structure 1031 and the first signal wire 1021 by using the HTM. In this manner, the manner for preparing the first anti-reflection structure 1031 and the first signal wire 1021 is ensured to be simple and low-cost, no alignment deviation exists, the good alignment precision is ensured, and at the same time, the coverage effect of the anti-reflection layer 103 on the first signal wire layer 102 is ensured.

Exemplarily, the first anti-reflection structure 1031 and the first signal wire 1021 shown in FIG. 9 are rectangles with similar shapes. It is to be understood that the first anti-reflection structure 1031 and the first signal wire 1021 may be of other similar shapes, which is not limited in the embodiments of the present disclosure.

Further, with continued reference to FIG. 9, $0<d1<1.5$ μm, and $0<d2<1.5$ μm. Considering the HTM process, d1 satisfying that 0<d1<1.5 μm and d2 satisfying that 0<d2<1.5 μm can match the HTM process. In an embodiment, d1 may be 0.1 μm, 0.3 μm, 0.5 μm, 0.7 μm, 0.9 μm, 1.1 μm or 1.3 μm, and d2 may be 0.1 μm, 0.3 μm, 0.5 μm, 0.7 μm, 0.9 μm, 1.1 μm or 1.3 μm. The values of d1 and d2 are not limited in the embodiments of the present disclosure, as long as 0<d1<1.5 μm and 0<d2<1.5 μm are satisfied and the HTM process is matched.

Further, the first signal wire layer 102 is adjacent to and in contact with the anti-reflection layer 103. The first anti-reflection structure 1031 shares a photomask with the first signal wire 1021, that is, the first anti-reflection structure 1031 and the first signal wire 1021 may be prepared through one photomask in the same process. In this manner, the manner for preparing the first anti-reflection structure 1031 and the first signal wire 1021 is ensured to be simple and low-cost, no alignment deviation exists, the good alignment precision is ensured, and at the same time, the coverage effect of the anti-reflection layer 103 on the first signal wire layer 102 is ensured.

Figure 10:
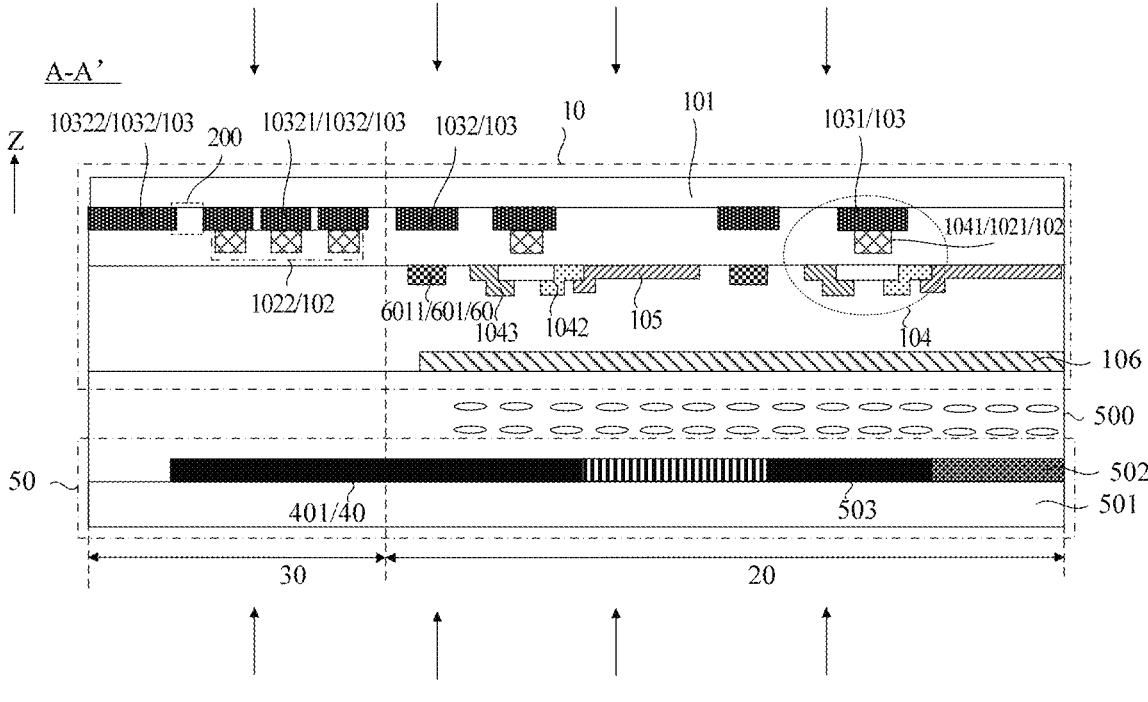
FIG. 10 is another sectional view of the display panel of FIG. 1 taken along A-A'.

FIG. 10 is another sectional view of the display panel of FIG. 1 taken along A-A'. Referring to FIG. 1 and FIG. 10, the display panel further includes at least one second signal wire layer 60, the second signal wire layer 60 is located on a side of the first signal wire layer 102 facing away from the first base 101, and the second signal wire layer 60 includes multiple third signal wires 601. The anti-reflection layer 103 further includes a third anti-reflection structure 1033 located in the display region 20, and an orthographic projection of the third anti-reflection structure 1033 on the plane where the first base 101 is located covers at least part of an orthographic projection of a third signal wire 601 on the plane where the first base 101 is located.

In an embodiment, the third signal wires 601 may be data signal wires and/or touch signal wires. The third signal wires 601 are metal wires and have relatively high surface glossiness so that the third signal wires 601 have relatively high reflectivity; therefore, the third signal wires 601 may also reflect some light, thus, causing the whitening phenomenon of the display region 20. In view of this, the third anti-reflection structure 1033 is disposed on a side of the third signal wire 601, and the orthographic projection of the third anti-reflection structure 1033 on the plane where the first base 101 is located covers at least part of the orthographic projection of the third signal wire 601 on the plane where the first base 101 is located. In this manner, the third anti-reflection structure 1033 can block the third signal wire 601, and thus the light reflection of the third signal wires 601 in the display region 20 can be avoided.

In a feasible implementation, with continued reference to FIG. 1 and FIG. 10, the third signal wires 601 may include data signal wires 6011; the orthographic projection of the third anti-reflection structure 1033 on the plane where the first base 101 is located covers at least part of an orthographic projection of a data signal wire 6011 on the plane where the first base 101 is located. In this manner, the third anti-reflection structure 1033 can block the data signal wire 6011, and thus the reflection of the data signal wire 6011 in the display region 20 can be avoided.

It is to be noted that the black matrices are used in the related art to block the data signal wire; in the embodiments of the present disclosure, the orthographic projection of the third anti-reflection structure 1033 on the plane where the first base 101 is located covers at least part of the orthographic projection of the data signal wire 6011 on the plane where the first base 101 is located, that is, the third anti-reflection structure 1033 can serve as the black matrix blocking the data signal wire; therefore, in the embodiment, the black matrix designed on the data-line side of the opposing substrate 50 can be canceled. Due to the alignment of the array substrate with the opposing substrate during the preparation process of the display panel, the more the positions where the black matrices are disposed, the higher the alignment precision is required. Therefore, the black matrix designed on the data-line side of the opposing substrate 50 is cancelled, and the third anti-reflection structure 1033 is used for blocking the data wire, so the requirement for the alignment precision between the array substrate 10 and the opposing substrate 50 can be lowered, and the alignment efficiency can be improved. Moreover, the third anti-reflection structure 1033 is located in the anti-reflection layer 103, and the third anti-reflection structure 1033 and the first anti-reflection structure 1031 are prepared through the same process and disposed in the same layer, so the setting of the third anti-reflection structure 1033 cannot increase the process difficulty of the display panel and the number of film layers in the display panel, and the preparation process of the display panel and the thinning design of the display panel cannot be affected.

Figure 11:
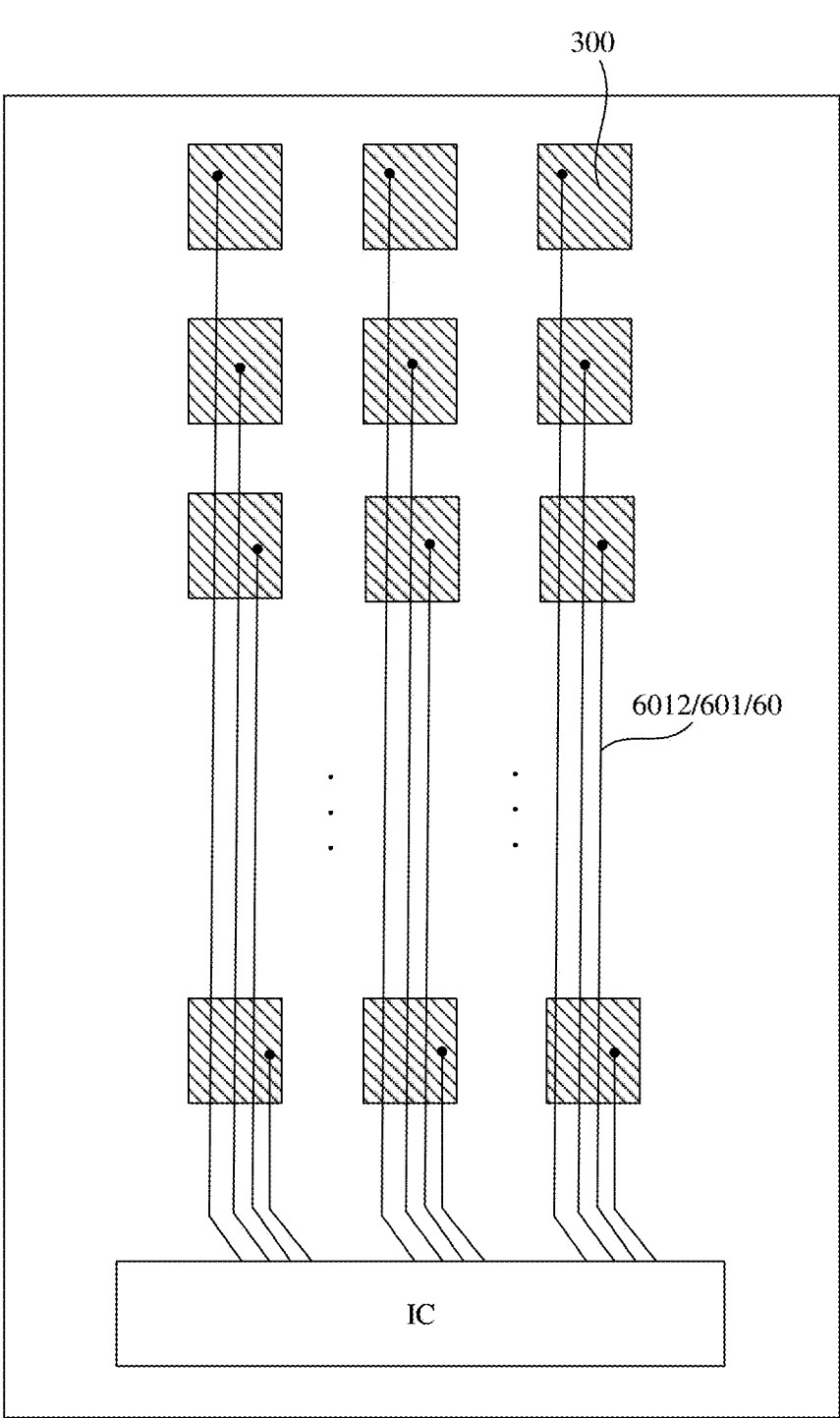
FIG. 11 is a top view of touch signal wires according to an embodiment of the present disclosure.

In another feasible implementation, FIG. 11 is a top view of touch signal wires according to an embodiment of the present disclosure. As shown in FIG. 11, the third signal wires 601 may include touch signal wires 6012; the orthographic projection of the third anti-reflection structure 1033 on the plane where the first base 101 is located covers at least part of an orthographic projection of a touch signal wire 6012 on the plane where the first base 101 is located.

In an embodiment, the touch signal wire 6012 is configured to connect a control electrode 300 and connected to the touch driver chip (such as the IC shown in the figure). It is to be understood that the touch driver chip may be disposed independently of the display driver chip or be integrated with the display driver chip into the same driver chip, which is not limited in the embodiments of the present disclosure. The touch driver chip provides a touch drive signal for the touch electrode 300 through the touch signal wire 6012, receives a touch sensing signal fed back from the touch electrode 300 through the touch signal wire 6012, and determines the position where touch occurs and/or the magnitude of the touch pressure based on the difference between the touch drive signal and the touch sensing signal. The surface of the touch signal wire 6012 has relatively high glossiness, and the third anti-reflection structure 1033 blocks the touch signal wire 6012 so that the reflection of the touch signal wire 6012 in the display region 20 can be avoided.

It is to be noted that the touch electrode provided in the embodiment of the present disclosure may be a self-capacitive touch electrode or a mutual-capacitive touch electrode, which is not limited in the embodiment of the present disclosure. FIG. 11 only illustrates the self-capacitive touch electrode as an example. Moreover, when the display panel includes a liquid crystal display panel, the self-capacitive touch electrode 300 may be reused as a common electrode in the liquid crystal display panel. That is, during a display stage, the common electrode receives a common potential signal and works together with the pixel electrode to drive liquid crystals to deflect, and during a touch detection stage, the self-capacitive touch electrode 300 receives the touch drive signal and feeds back the touch sensing signal to achieve sensing of the touch position and/or the touch pressure.

In another feasible implementation, the third signal wires include data signal wires and touch signal wires. The data signal wires and the touch signal wires are disposed in the same layer, or the data signal wires and the touch signal wires are disposed in different layers.

The preceding embodiments only illustrate the example where the third signal wires are data signal wires or touch signal wires. It is to be understood that in the technical schemes provided in the embodiments of the present disclosure, the third signal wires may include both data signal wires and touch signal wires. Moreover, it is to be understood that the data signal wires and the touch signal wires may disposed in the same layer. In this manner, on the one hand, the number of photomasks used during the preparation process of the display panel can be reduced; on the other hand, the number of film layers in the display panel can be reduced, achieving the thinning design of the display panel. Alternatively, the data signal wires and the touch signal wires are disposed in different layers. In this manner, the wiring of the data signal wires and the touch signal wires is more flexible, and the interference between the data signal wires and the touch signal wires is relatively small.

In summary, diverse designs may be used for designing the wire type and the wire film layer of the third signal wires in the embodiment of the present disclosure and can satisfy various display panel setting requirements. The embodiments of the present disclosure do not limit the design, as long as the orthographic projection of the third anti-reflection structure on the plane where the first base is located covers at least part of the orthographic projection of the third signal wire on the plane where the first base is located. In this manner, the third anti-reflection structure absorbs or scatters the light that should have been incident on the third signal wire, so the reflectivity in the region where the third signal wire is disposed on the display panel is reduced, the whitening issue of light emission of the display panel is avoided, and thus the display effect is improved.

FIG. 12 is an enlarged view of region B in the display panel of FIG. 1. As shown in FIG. 12, multiple first anti-reflection structures 1031 extend along the first direction (direction Y shown in the figure) and are arranged along the second direction (direction X shown in the figure), and the first direction Y intersects the second direction X. The third anti-reflection structure 1033 includes multiple anti-reflection subdivisions 10331, the multiple anti-reflection subdivisions 10331 extend along the second direction X, and multiple anti-reflection subdivisions 331 of the same third anti-reflection structure 1033 are arranged along the second direction X. Along the second direction X, an anti-reflection subdivision 10331 is located between two adjacent first anti-reflection structures 1031, and a second gap 400 exists between the anti-reflection subdivision 10331 and one of the two adjacent first anti-reflection structures 1031. A third signal wire 601 includes a first wire subdivision 61 and a second wire subdivision 61 connected to each other, an orthographic projection of the anti-reflection subdivision 10331 on the plane where the first base 101 is located covers an orthographic projection of the first wire subdivision 61 on the plane where the first base 101 is located, and an orthographic projection of the second gap 400 on the plane where the first base 101 is located overlaps an orthographic projection of the second wire subdivision 62 on the plane where the first base 101 is located. The display panel further includes a light-shielding layer 70, and an orthographic projection of the light-shielding layer 70 on the plane where the first base 101 is located covers at least part of the orthographic projection of the second wire subdivision 62 on the plane where the first base 101 is located.

Only one pixel unit is shown in FIG. 12. It is to be understood that the display panel includes multiple pixel units, and the multiple pixel units are arranged in an array. Along the second direction X, an anti-reflection subdivision 10331 is located between two adjacent first anti-reflection structures 1031, and the second gap 400 exists between the anti-reflection subdivision 10331 and one of the two adjacent first anti-reflection structures 1031. That is, the anti-reflection subdivision 10331 and the first anti-reflection structures 1031 are not a complete anti-reflection structure, but are independently disposed, so the second gap 400 exists between the anti-reflection subdivision 10331 and the first anti-reflection structure 1031. Since the first anti-reflection structure 1031 is in contact with the first signal wire 1021, the signal in the first signal wire 1021 inevitably exists in the first anti-reflection structure 1031. The independent arrangement of the anti-reflection subdivision 10331 and the first anti-reflection structure 1031 can ensure that the signal in the first signal wire 1021 does not exist in the anti-reflection subdivision 10331. In this manner, when the anti-reflection subdivision 10331 is disposed directly opposite the third signal wire 601, no interference is caused to the signal in the third signal wire 601, that is, the normal transmission of the signal in the third signal wire 601 cannot be affected, and the normal display function and/or the normal touch function of the display panel can be ensured.

Further, the third signal wire 601 includes the first wire subdivision 61 and the second wire subdivision 61 connected to each other, the second wire subdivision 62 is located in the region of the second gap 400, and the orthographic projection of the light-shielding layer 70 on the plane where the first base 101 is located covers at least part of the orthographic projection of the second wire subdivision 62 on the plane where the first base 101 is located. That is, the light-shielding layer 70 can cover at least part of the second wire subdivision 62 so that the reflection of the second wire subdivision 62 can be reduced.

Exemplarily, the light-shielding layer 70 may be disposed in the same layer as the black matrices, that is, the light-shielding layer 70 may be disposed in the same layer and prepared through the same process as an existing film layer in the display panel so that both the simple process and the simple structure of the display panel can be ensured.

On the basis of the same inventive concept, an embodiment of the present disclosure further provides a preparation method of a display panel. FIG. 13 is a flowchart of a preparation method of a display panel according to an embodiment of the present disclosure. As shown in FIG. 13, the preparation method includes the steps described below.

In S101, a first base is provided, and an anti-reflection layer and a first signal wire layer are sequentially prepared on a side of the first base.

With continued reference to FIG. 2, the first base 101 may be a rigid base or a flexible base, and the anti-reflection layer 103 and the first signal wire layer 102 are sequentially prepared on the side of the first base 101. The anti-reflection layer 103 is configured to cover at least part of the first signal wire layer 102 to avoid the bright edges or surface whitening of the display panel caused by the reflection of metal wires in the first signal wire layer 102.

Exemplarily, the material of the anti-reflection layer 103 includes a metal oxide material, such as molybdenum oxide or chromium oxide.

In S102, the anti-reflection layer and the first signal wire layer are patterned so that a first anti-reflection structure located in a display region and a second anti-reflection structure located in a non-display region are formed in the anti-reflection layer, and a first signal wire located in the display region is formed in the first signal wire layer.

An orthographic projection of the first anti-reflection structure on a plane where the first base is located covers at least part of an orthographic projection of the first signal wire on the plane where the first base is located.

With continued reference to FIG. 2, the anti-reflection layer 103 is patterned so that the anti-reflection layer 103 includes the first anti-reflection structure 1031 located in the display region 20 and the second anti-reflection structure 1032 located in the non-display region 30, and the first signal wire layer 102 is patterned so that the first signal wire 1021 located in the display region can be formed. The orthographic projection of the first anti-reflection structure 1031 on the plane where the first base 101 is located covers at least part of the orthographic projection of the first signal wire 1021 on the plane where the first base 101 is located, that is, the first anti-reflection structure 1031 is disposed in the display region 20, and the orthographic projection of the first anti-reflection structure 1031 covers part of the first signal wire 1021 or completely cover the first signal wire 1021. In this manner, the phenomenon of display whitening caused by the reflection of a gate 1041 can be reduced. Metal wires, such as a second signal wire 1022, are also disposed in the non-display region 30. The surface of these metal wires has relatively high glossiness so that the metal wires have relatively high reflectivity and may reflect some light, and the whitening phenomenon also occurs in the non-display region 30. Therefore, the second anti-reflection structure 1032 disposed in the non-display region 30 can cover at least part of metal wires. It is to be understood that the first anti-reflection structure 1031 located in the display region 20 may extend to the non-display region 30, that is, the first anti-reflection structure 1031 and the second anti-reflection structure 1032 may be disposed in the same layer. In this manner, on the one hand, the setting manner is simple; on the other hand, the second anti-reflection structure 1032 can fully block the metal wires in the non-display region 30, which can avoid the reflection of the second signal wire 1022 in the non-display region 30.

It is to be understood that the orthographic projection of the first anti-reflection structure 1031 on the plane where the first base 101 is located covers at least part of the orthographic projection of the first signal wire 1021 on the plane where the first base 101 is located, that is, the first anti-reflection structure 1031 may cover part of the orthographic projection of the first signal wire 1021 so that the first anti-reflection structure 1031 can block part of the reflection of metal of the first signal wire 1021; alternatively, the first anti-reflection structure 1031 may fully cover the orthographic projection of the first signal wire 1021 so that the reflection of metal of the first signal wire 1021 can be completely blocked.

According to the preparation method of the display panel provided in the embodiment of the present disclosure, the anti-reflection layer and the first signal wire are patterned, so the orthographic projection of the first anti-reflection structure on the plane where the first base is located covers at least part of the orthographic projection of the first signal wire on the plane where the first base is located, that is, the first anti-reflection structure can cover the metal wire in the display region; moreover, the second anti-reflection structure can cover the metal wire in the non-display region. In this manner, the reflection of metal in the display region and the non-display region can be alleviated, and thus the display performance of the display panel can be improved.

Figure 14:
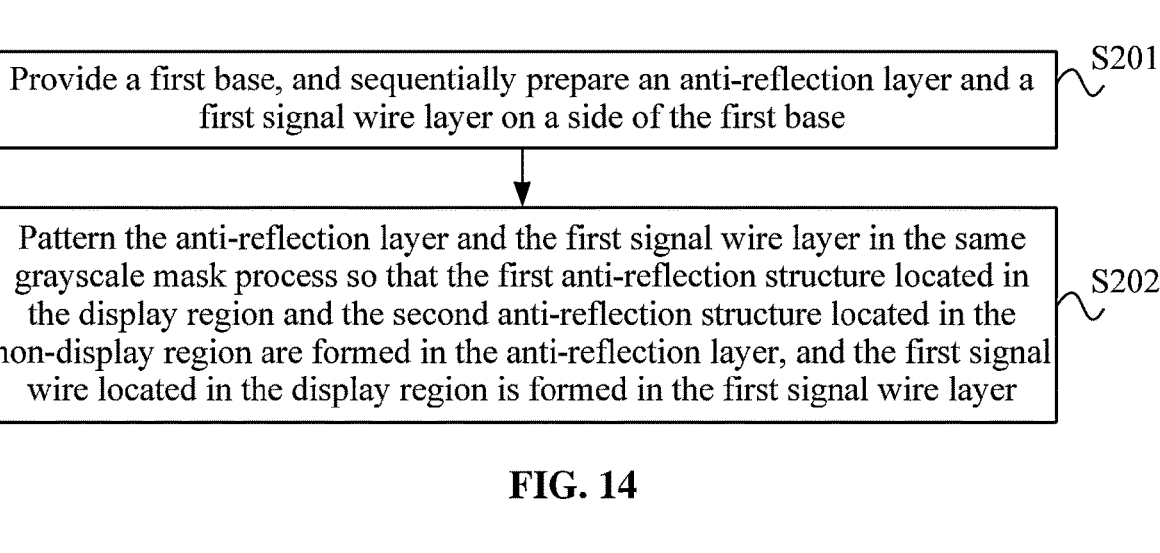
FIG. 14 is a flowchart of another preparation method of a display panel according to an embodiment of the present disclosure.

FIG. 14 is a flowchart of another preparation method of a display panel according to an embodiment of the present disclosure. FIG. 14 provides a detailed explanation of the operations for patterning the anti-reflection layer and the first signal wire layer based on the preceding embodiments. As shown in FIG. 14, the preparation method includes the steps described below.

In S201, a first base is provided and an anti-reflection layer and a first signal wire layer are sequentially prepared on a side of the first base.

In S202, the anti-reflection layer and the first signal wire layer are patterned in the same grayscale mask process, the first anti-reflection structure located in the display region and the second anti-reflection structure located in the non-display region are formed in the anti-reflection layer, and the first signal wire located in the display region is formed in the first signal wire layer.

The shape of the first anti-reflection structure is similar to the shape of the first signal wire. The first signal wire includes a first boundary, and the first anti-reflection structure includes a second boundary. Any two positions in the first boundary include a first position and a second position, the minimum distance between the first position and the second boundary is d1, and the minimum distance between the second position and the second boundary is d2, where $|d1-d2|/d1 \leq 10\%$.

The grayscale mask process can provide varying transmittance at different positions on the mask plane, that is, the light transmittance varies at different positions on the same plane. The same mask process may use the half-tone mask (HTM) process. The HTM process forms two different film thicknesses by exposure according to partial transmittance characteristics of specific regions. The transmittance at different positions is controlled by controlling the thickness of the film at different regions of the photomask. In this manner, on the one hand, the preparation manner is simple and efficient; on the other hand, using only one photomask can implement patterning of the anti-reflection layer and the first signal wire layer, and also save costs. Moreover, only one photomask is used for patterning the anti-reflection layer and the first signal wire layer in the same process, and no alignment process is required for the anti-reflection layer and the first signal wire layer, so no alignment deviation exists, and the coverage effect of the anti-reflection layer on the first signal wire layer is ensured.

With continued reference to FIG. 8, when the first anti-reflection structure 1031 and the first signal wire 1021 are prepared by using the HTM, in an ideal state, d1 and d2 may satisfy that d1=d2. However, due to the limited process accuracy, a certain difference exists between d1 and d2, that is, d1 is approximately equal to d2.

According to the preparation method of a display panel provided in the embodiment of the present disclosure, the anti-reflection layer and the first signal wire layer are patterned in the same grayscale mask process. In this manner, on the one hand, the preparation manner is simple and efficient; on the other hand, using only one photomask can implement patterning the anti-reflection layer and the first signal wire layer, and save the costs. Moreover, only one photomask is used for patterning the anti-reflection layer and the first signal wire layer in the same process, and no alignment process is required for the anti-reflection layer and the first signal wire layer, so no alignment deviation exists, and the coverage effect of the anti-reflection layer on the first signal wire layer is ensured.

Figure 15:
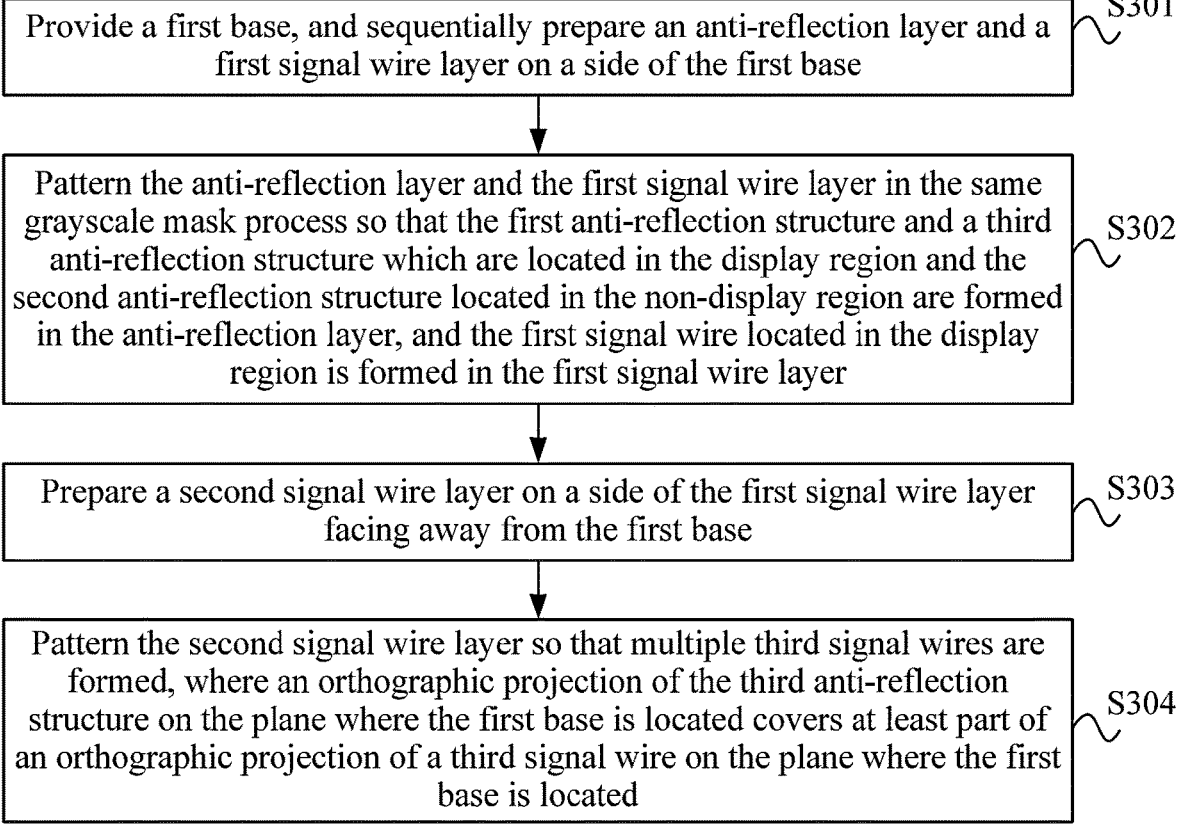
FIG. 15 is a flowchart of another preparation method of a display panel according to an embodiment of the present disclosure.

FIG. 15 is a flowchart of another preparation method of a display panel according to an embodiment of the present disclosure. FIG. 15 provides a detailed explanation of the operations for patterning the anti-reflection layer and the first signal wire layer based on the preceding embodiments. As shown in FIG. 15, the preparation method includes the steps described below.

In S301, a first base is provided and an anti-reflection layer and a first signal wire layer are sequentially prepared on a side of the first base.

In S302, the anti-reflection layer and the first signal wire layer are patterned in the same grayscale mask process, the first anti-reflection structure and a third anti-reflection structure which are located in the display region and the second anti-reflection structure located in the non-display region are formed in the anti-reflection layer, and the first signal wire located in the display region is formed in the first signal wire layer.

The display region includes multiple metal wires disposed in different layers, so the first anti-reflection structure and the third anti-reflection structure which are located in the display region can be formed by patterning the anti-reflection layer. The first anti-reflection structure is configured to cover at least part of the first signal wire, and the second anti-reflection structure is configured to cover at least part of the second signal wire.

In S303, a second signal wire layer is prepared on a side of the first signal wire layer facing away from the first base.

The second signal wire layer may include data signal wires and/or touch signal wires.

In S304, the second signal wire layer is patterned so that multiple third signal wires are formed, where an orthographic projection of the third anti-reflection structure on the plane where the first base is located covers at least part of an orthographic projection of a third signal wire on the plane where the first base is located.

With continued reference to FIG. 10, the third signal wires 601 may be data signal wires and/or touch signal wires. The third signal wires 601 are metal wires and have relatively high surface glossiness, thus having relatively high reflectivity; therefore, the third signal wires 601 may also reflect some light so that the whitening phenomenon of the display region 20 is caused. In view of this, the third anti-reflection structure 1033 is disposed on a side of the third signal wire 601, and the orthographic projection of the third anti-reflection structure 1033 on the plane where the first base 101 is located covers at least part of the orthographic projection of the third signal wire 601 on the plane where the first base 101 is located. In this manner, the third anti-reflection structure 1033 can cover the third signal wire 601, and thus the reflection problem of the third signal wire 601 in the display region 20 can be solved.

According to the preparation method of a display panel provided in the embodiment of the present disclosure, the first anti-reflection structure and the third anti-reflection structure which are located in the display region and the second anti-reflection structure located in the non-display region are formed in the anti-reflection layer, so the anti-reflection layer located in the display region and the non-display region can cover different types of metal wires, and the reflection of metal in the display panel can be further avoided.

FIG. 16 is a flowchart of another preparation method of a display panel according to an embodiment of the present disclosure. FIG. 16 provides a detailed explanation of the operations for patterning the anti-reflection layer and the first signal wire layer based on the preceding embodiments. As shown in FIG. 16, the preparation method includes the steps described below.

In S401, a first base is provided and an anti-reflection layer and a first signal wire layer are sequentially prepared on a side of the first base.

In S402, the anti-reflection layer and the first signal wire layer are patterned in the same grayscale mask process so that a first anti-reflection sub-structure located in the non-display region and a second anti-reflection sub-structure located in the non-display region are formed in the anti-reflection layer, where the second anti-reflection sub-structure is located on a side of the first anti-reflection sub-structure facing an edge of the first base, and a first gap exists between the first anti-reflection sub-structure and the second anti-reflection sub-structure.

With continued reference to FIG. 2, the second anti-reflection structure 1032 includes the first anti-reflection sub-structure 10321 and the second anti-reflection sub-structure 10322, the second anti-reflection sub-structure 10322 is located on the side of the first anti-reflection sub-structure 10321 facing the edge of the first base 101, and the first gap 200 exists between the first anti-reflection sub-structure 10321 and the second anti-reflection sub-structure 10322. The first gap 200 exists between the first anti-reflection sub-structure 10321 and the second anti-reflection sub-structure 10322, and the first gap 200 penetrates through the anti-reflection layer 103, that is, the first anti-reflection sub-structure 10321 and the second anti-reflection sub-structure 10322 are disconnected to form the first gap 200. Exemplarily, the width of the first gap 200 may be 20 μm. In this manner, the static electricity generated during cutting on one side of the edge of the first base 101, that is, during cutting the display panel along the cutting line, can be prevented from being transmitted through the second anti-reflection sub-structure to the metal wires due to powered cutting. That is, the static electricity can be prevented from extending to the second signal wire 1022 in the non-display region 30, and further the impact on signals in the second signal wire 1022 can be avoided.

In S403, the first base and the second anti-reflection structure are cut along a cutting line.

With continued reference to FIG. 2, the first gap 200 exists between the first anti-reflection sub-structure 10321 and the second anti-reflection sub-structure 10322, so no static electricity is generated when the first base 101 and the second anti-reflection structure 1032 are cut along the cutting line.

According to the preparation method of a display panel provided in the embodiment of the present disclosure, the first gap exists between the first anti-reflection sub-structure and the second anti-reflection sub-structure so that the static electricity generated during cutting on one side of the edge of the first base can be prevented from extending to the second signal wire in the non-display region, and thus the impact on signals in the second signal wire can be avoided.

On the basis of the same inventive concept, an embodiment of the present disclosure further provides a display device. FIG. 17 is a structural diagram of a display device according to an embodiment of the present disclosure. As shown in FIG. 17, the display device includes the display panel provided in the preceding embodiments, so the display device has the beneficial effects described in the preceding embodiments. Details are not described herein. Exemplarily, the display device may be an electronic device such as a mobile phone, a computer, a smart wearable device (for example, a smart watch) or an in-vehicle display device. This is not limited in the embodiments of the present disclosure.

It is to be noted that the preceding are embodiments of the present disclosure and technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, although the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A display panel, comprising an array substrate, wherein the array substrate comprises a first base, a first signal wire layer located on a side of the first base, and an anti-reflection layer located between the first signal wire layer and the first base;

wherein the display panel further comprises a display region and a non-display region; the first signal wire layer comprises a first signal wire located in the display region, and the anti-reflection layer comprises a first anti-reflection structure located in the display region and a second anti-reflection structure located in the non-display region; and an orthographic projection of the first anti-reflection structure on a plane where the first base is located covers at least part of an orthographic projection of the first signal wire on the plane where the first base is located;

wherein the first signal wire layer further comprises a second signal wire located in the non-display region; the second anti-reflection structure comprises a first anti-reflection sub-structure and a second anti-reflection sub-structure, the second anti-reflection sub-structure is located on a side of the first anti-reflection sub-structure facing an edge of the first base, and a first gap exists between the first anti-reflection sub-structure and the second anti-reflection sub-structure, wherein the first gap penetrates through the anti-reflection layer; and an orthographic projection of the first anti-reflection sub-structure on the plane where the first base is located covers an orthographic projection of the second signal wire on the plane where the first base is located; and wherein the display panel further comprises a light absorption layer located on a side of the anti-reflection layer facing away from the first base, an orthographic projection of the light absorption layer on the plane where the first base is located covers an orthographic projection of the first gap on the plane where the first base is located.

2. The display panel according to claim 1, further comprising an opposing substrate located on a side of the array substrate, wherein the opposing substrate comprises a second base;

wherein the light absorption layer comprises a black light absorption layer located in the opposing substrate, and the black light absorption layer is located on a side of the second base facing the array substrate.

3. The display panel according to claim 1, further comprising an opposing substrate located on a side of the array substrate, wherein the opposing substrate comprises a second base;

wherein the light absorption layer comprises light-filtering structures having at least two different colors, the light-filtering structures are arranged to be stacked in the opposing substrate, and the light-filtering structures are located on a side of the second base facing the array substrate.

4. The display panel according to claim 1, wherein the second anti-reflection structure extends to an edge of the first base.

5. The display panel according to claim 1, wherein the first signal wire layer comprises a plurality of first signal wires, and the plurality of first signal wires extend along a first direction and are arranged along a second direction, wherein the first direction intersects the second direction;

the anti-reflection layer comprises a plurality of first anti-reflection structures, and the plurality of first anti-reflection structures extend along the first direction and are arranged along the second direction; and the plurality of first signal wires correspond to the plurality of first anti-reflection structures.

6. The display panel according to claim 1, wherein a shape of the first anti-reflection structure is similar to a shape of the first signal wire;

the first signal wire comprises a first boundary, and the first anti-reflection structure comprises a second boundary; and two positions in the first boundary comprise a first position and a second position, a minimum distance between the first position and the second boundary is d1, and a minimum distance between the second position and the second boundary is d2, wherein |d1−d2|/d1≤10%.

7. The display panel according to claim 6, wherein 0<d1<1.5 μm; and 0<d2<1.5 μm.

8. The display panel according to claim 6, wherein the first signal wire layer and the anti-reflection layer are adjacent and in contact with each other; and the first anti-reflection structure shares a photomask with the first signal wire.

9. A preparation method of the display panel according to claim 1, comprising:

providing the first base, and sequentially preparing the anti-reflection layer and the first signal wire layer on the side of the first base; and patterning the anti-reflection layer and the first signal wire layer to form, in the anti-reflection layer, the first anti-reflection structure located in the display region and the second anti-reflection structure located in the non-display region, and to form, in the first signal wire layer, the first signal wire located in the display region.

10. The preparation method according to claim 9, wherein patterning the anti-reflection layer and the first signal wire layer comprises:

patterning the anti-reflection layer and the first signal wire layer by using a same grayscale mask process to form, in the anti-reflection layer, the first anti-reflection structure located in the display region and the second anti-reflection structure located in the non-display region, and to form, in the first signal wire layer, the first signal wire located in the display region, wherein a shape of the first anti-reflection structure is similar to a shape of the first signal wire;

the first signal wire comprises a first boundary, and the first anti-reflection structure comprises a second boundary; and two positions in the first boundary comprise a first position and a second position, a minimum distance between the first position and the second boundary is d1, and a minimum distance between the second position and the second boundary is d2, wherein |d1−d2|/d1≤10%.

11. The preparation method according to claim 9, wherein patterning the anti-reflection layer and the first signal wire layer comprises:

patterning the anti-reflection layer and the first signal wire layer by using a same grayscale mask process to form, in the anti-reflection layer, the first anti-reflection structure and a third anti-reflection structure which are located in the display region and the second anti-reflection structure located in the non-display region, and to form, in the first signal wire layer, the first signal wire located in the display region; and the preparation method further comprises:

preparing a second signal wire layer on a side of the first signal wire layer facing away from the first base; and patterning the second signal wire layer to form a plurality of third signal wires, wherein an orthographic projection of the third anti-reflection structure on the plane where the first base is located covers at least part of an orthographic projection of a third signal wire of the plurality of third signal wires on the plane where the first base is located.

12. The preparation method according to claim 9, wherein patterning the anti-reflection layer and the first signal wire layer comprises:

patterning the anti-reflection layer and the first signal wire layer by using a same grayscale mask process to form, in the anti-reflection layer, a first anti-reflection sub-structure and a second anti-reflection sub-structure which are located in the non-display region, wherein the second anti-reflection sub-structure is located on a side of the first anti-reflection sub-structure facing an edge of the first base, and a first gap exists between the first anti-reflection sub-structure and the second anti-reflection sub-structure; and cutting the first base and the second anti-reflection structure along a cutting line.

13. A display device, comprising the display panel according to claim 1.

14. A display panel, comprising an array substrate, wherein the array substrate comprises a first base, a first signal wire layer located on a side of the first base, and an anti-reflection layer located between the first signal wire layer and the first base;

wherein the display panel further comprises a display region and a non-display region; the first signal wire layer comprises a first signal wire located in the display region, and the anti-reflection layer comprises a first anti-reflection structure located in the display region and a second anti-reflection structure located in the non-display region; and an orthographic projection of the first anti-reflection structure on a plane where the first base is located covers at least part of an orthographic projection of the first signal wire on the plane where the first base is located;

wherein the display panel further comprises at least one second signal wire layer, the at least one second signal wire layer is located on a side of the first signal wire layer facing away from the first base, and the at least one second signal wire layer comprises a plurality of third signal wires; and wherein the anti-reflection layer further comprises a third anti-reflection structure located in the display region, and an orthographic projection of the third anti-reflection structure on the plane where the first base is located covers at least part of an orthographic projection of a third signal wire of the plurality of third signal wires on the plane where the first base is located.

15. The display panel according to claim 14, wherein the plurality of third signal wires comprise a data signal wire; and the orthographic projection of the third anti-reflection structure on the plane where the first base is located covers at least part of an orthographic projection of the data signal wire on the plane where the first base is located; or wherein the plurality of third signal wires comprise a touch signal wire; and the orthographic projection of the third anti-reflection structure on the plane where the first base is located covers at least part of an orthographic projection of the touch signal wire on the plane where the first base is located; or wherein the plurality of third signal wires comprise a data signal wire and a touch signal wire; and the data signal wire and the touch signal wire are disposed in a same layer, or the data signal wire and the touch signal wire are disposed in different layers.

16. The display panel according to claim 14, wherein the anti-reflection layer comprises a plurality of first anti-reflection structures, and the plurality of first anti-reflection structures extend along a first direction and are arranged along a second direction, wherein the first direction intersects the second direction;

the third anti-reflection structure comprises a plurality of anti-reflection subdivisions, wherein the plurality of anti-reflection subdivisions extend along the second direction and are arranged along the second direction;

along the second direction, an anti-reflection subdivision of the plurality of anti-reflection subdivisions is located between two adjacent first anti-reflection structures of the plurality of first anti-reflection structures, and a second gap exists between the anti-reflection subdivision and a first anti-reflection structure of the two adjacent first anti-reflection structures;

a third signal wire of the plurality of third signal wires comprises a first wire subdivision and a second wire subdivision connected to each other, an orthographic projection of the anti-reflection subdivision on the plane where the first base is located covers an orthographic projection of the first wire subdivision on the plane where the first base is located, and an orthographic projection of the second gap on the plane where the first base is located overlaps an orthographic projection of the second wire subdivision on the plane where the first base is located; and the display panel further comprises a light-shielding layer, and an orthographic projection of the light-shielding layer on the plane where the first base is located covers at least part of the orthographic projection of the second wire subdivision on the plane where the first base is located.

17. A display device, comprising the display panel according to claim 14.

18. The display panel according to claim 14, wherein the first signal wire layer further comprises a second signal wire located in the non-display region;

the second anti-reflection structure comprises a first anti-reflection sub-structure and a second anti-reflection sub-structure, the second anti-reflection sub-structure is located on a side of the first anti-reflection sub-structure facing an edge of the first base, and a first gap exists between the first anti-reflection sub-structure and the second anti-reflection sub-structure, wherein the first gap penetrates through the anti-reflection layer; and an orthographic projection of the first anti-reflection sub-structure on the plane where the first base is located covers an orthographic projection of the second signal wire on the plane where the first base is located.

19. A display panel, comprising an array substrate, wherein the array substrate comprises a first base, a first signal wire layer located on a side of the first base, and an anti-reflection layer located between the first signal wire layer and the first base;

wherein the display panel further comprises a display region and a non-display region; the first signal wire layer comprises a first signal wire located in the display region, and the anti-reflection layer comprises a first anti-reflection structure located in the display region and a second anti-reflection structure located in the non-display region; and an orthographic projection of the first anti-reflection structure on a plane where the first base is located covers at least part of an orthographic projection of the first signal wire on the plane where the first base is located;

wherein the array substrate further comprises an opposing substrate, the opposing substrate is located on a side of the array substrate facing away from a light emission side of the display panel; or the opposing substrate is located on a side of the array substrate facing a light emission side of the display panel; and wherein the array substrate further comprises a pixel circuit, a first electrode and a second electrode which are located on a side of the first base facing the opposing substrate;

the pixel circuit comprises a thin-film transistor, the thin-film transistor comprises a gate, a source and a drain, the gate is located in the first signal wire layer, and the source or the drain is electrically connected to and in contact with the first electrode; and the opposing substrate comprises a second base, a light-filtering structure and a black light absorption layer, wherein the light-filtering structure and the black light absorption layer are located on a side of the second base facing the array substrate.

20. A display device, comprising the display panel according to claim 19.

* * * * *